United States Patent
Ramachandran et al.

(10) Patent No.: US 11,157,368 B2
(45) Date of Patent: Oct. 26, 2021

(54) USING SNAPSHOTS TO ESTABLISH OPERABLE PORTIONS OF COMPUTING ENTITIES ON SECONDARY SITES FOR USE ON THE SECONDARY SITES BEFORE THE COMPUTING ENTITY IS FULLY TRANSFERRED

(71) Applicant: Nutanix, Inc., San Jose, CA (US)

(72) Inventors: Parthasarathy Ramachandran, Palo Alto, CA (US); Bharat Kumar Beedu, Bangalore (IN); Monoreet Mutsuddi, San Jose, CA (US); Vanita Prabhu, Bengaluru (IN); Mayur Vijay Sadavarte, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 37 days.

(21) Appl. No.: 16/200,482

(22) Filed: Nov. 26, 2018

(65) Prior Publication Data
US 2019/0354441 A1 Nov. 21, 2019

Related U.S. Application Data

(60) Provisional application No. 62/591,115, filed on Nov. 27, 2017.

(51) Int. Cl.
*G06F 11/14* (2006.01)
*G06F 11/20* (2006.01)

(52) U.S. Cl.
CPC ...... *G06F 11/1458* (2013.01); *G06F 11/1451* (2013.01); *G06F 11/2074* (2013.01); *G06F 11/2094* (2013.01); *G06F 2201/84* (2013.01)

(58) Field of Classification Search
CPC ............ G06F 11/1458; G06F 11/1451; G06F 11/2074; G06F 11/2094
(Continued)

(56) References Cited

U.S. PATENT DOCUMENTS 5,592,618 A 1/1997 Micka et al.
6,493,796 B1 12/2002 Arnon et al.
(Continued)

OTHER PUBLICATIONS

Arrieta-Salinas, Itziar, et al., "Classic Replication Techniques on the Cloud", ARES 2012, Prague, Czech Republic, Aug. 20-24, 2012, pp. 268-273.*

(Continued)

*Primary Examiner* — Robert Stevens
(74) *Attorney, Agent, or Firm* — Vista IP Law Group, LLP

(57) ABSTRACT

Systems and methods for using snapshots to establish operable portions of computing entities on secondary sites for use on the secondary sites before the computing entity is fully transferred to the secondary site. Embodiments commence upon initiating replication of an entity from an originating site to a secondary site. While replication of the entire entity from the originating site to the secondary site is being carried out, the originating site transfers entity metadata to the secondary site. A non-replication user process queries the metadata to determine completion status and/or other characteristics of subcomponents of the entity. After determining the completion status of subcomponents of the entity, the non-replication user process operates on subcomponent data of the entity even before the data of the entity has been completely copied to the secondary site. The subcomponents may comprise certain tables of a database or certain rows of a table of a database.

24 Claims, 15 Drawing Sheets

(58) Field of Classification Search
USPC .......................................................... 707/640
See application file for complete search history.

(56) References Cited

U.S. PATENT DOCUMENTS

| | | | |
|---|---|---|---|
| 7,136,974 B2* | 11/2006 | Burton | G06F 3/0608 |
| | | | 711/162 |
| 7,346,805 B1 | 3/2008 | Scharland et al. | |
| 7,467,266 B2* | 12/2008 | Burton | G06F 16/128 |
| | | | 711/162 |
| 7,515,287 B2 | 4/2009 | Kitada | |
| 7,519,628 B1 | 4/2009 | Leverett et al. | |
| 7,574,418 B1 | 8/2009 | Patterson et al. | |
| 7,725,671 B2 | 5/2010 | Prahlad et al. | |
| 7,734,669 B2* | 6/2010 | Kottomtharayil | G06F 11/1448 |
| 7,765,187 B2 | 7/2010 | Bergant et al. | |
| 7,779,295 B1* | 8/2010 | Shah | G06F 11/1458 |
| | | | 714/6.32 |
| 7,840,533 B2 | 11/2010 | Prahlad et al. | |
| 7,840,536 B1 | 11/2010 | Ahal et al. | |
| 8,140,772 B1 | 3/2012 | Yang | |
| 8,447,728 B2 | 5/2013 | Prahlad et al. | |
| 8,549,518 B1 | 10/2013 | Aron et al. | |
| 8,601,473 B1 | 12/2013 | Aron et al. | |
| 8,762,335 B2 | 6/2014 | Prahlad et al. | |
| 8,826,283 B2 | 9/2014 | Chen et al. | |
| 8,850,130 B1 | 9/2014 | Aron et al. | |
| 8,914,567 B2 | 12/2014 | Miroshnichenko et al. | |
| 9,069,704 B2 | 6/2015 | Schreter et al. | |
| 9,081,754 B1 | 7/2015 | Natanzon et al. | |
| 9,223,659 B1 | 12/2015 | Natanzon et al. | |
| 9,268,602 B2* | 2/2016 | Prahlad | G06F 9/45558 |
| 9,311,242 B1 | 4/2016 | Banerjee | |
| 9,405,481 B1 | 8/2016 | Cohen et al. | |
| 9,626,212 B2 | 4/2017 | Beveridge et al. | |
| 9,740,577 B1 | 8/2017 | Chakraborty et al. | |
| 9,740,723 B2 | 8/2017 | Prahlad et al. | |
| 9,772,866 B1 | 9/2017 | Aron et al. | |
| 9,946,569 B1 | 4/2018 | Beedu et al. | |
| 1,021,004 A1 | 2/2019 | Sancheti | |
| 1,024,865 A1 | 4/2019 | Prahlad et al. | |
| 10,255,137 B1 | 4/2019 | Panidis et al. | |
| 10,423,634 B1* | 9/2019 | Shemer | G06F 16/2358 |
| 10,437,783 B1 | 10/2019 | Cohen et al. | |
| 10,484,179 B1 | 11/2019 | Natanzon et al. | |
| 10,545,682 B1 | 1/2020 | Dalal et al. | |
| 1,064,986 A1 | 5/2020 | Natanzon et al. | |
| 2003/0051109 A1 | 3/2003 | Cochran | |
| 2003/0072263 A1 | 4/2003 | Peterson | |
| 2003/0191743 A1 | 10/2003 | Brodersen et al. | |
| 2006/0047926 A1 | 3/2006 | Zheng | |
| 2006/0053261 A1 | 3/2006 | Prahlad et al. | |
| 2006/0075281 A1 | 4/2006 | Kimmel et al. | |
| 2007/0185937 A1 | 8/2007 | Prahlad et al. | |
| 2010/0107158 A1 | 4/2010 | Chen et al. | |
| 2014/0115341 A1 | 4/2014 | Robertson | |
| 2014/0279892 A1 | 9/2014 | Bourbonnais et al. | |
| 2014/0317597 A1 | 10/2014 | Marks | |
| 2016/0210195 A1* | 7/2016 | Sinha | G06F 11/1464 |
| 2016/0342334 A1 | 11/2016 | Elisha | |
| 2016/0359955 A1 | 12/2016 | Gill et al. | |
| 2017/0060449 A1 | 3/2017 | Zucca et al. | |
| 2017/0131905 A1 | 5/2017 | Agombar et al. | |
| 2017/0193012 A1 | 7/2017 | Gupta et al. | |
| 2017/0262520 A1* | 9/2017 | Mitkar | G06F 16/275 |
| 2017/0315728 A1 | 11/2017 | Zheng et al. | |
| 2018/0121453 A1* | 5/2018 | Jain | G06F 11/1448 |
| 2018/0143880 A1* | 5/2018 | Dornemann | G06F 16/258 |
| 2018/0276084 A1* | 9/2018 | Mitkar | G06F 3/0656 |
| 2018/0285214 A1 | 10/2018 | Ashraf et al. | |
| 2019/0340075 A1 | 11/2019 | Ramachandran et al. | |
| 2020/0097376 A1 | 3/2020 | Zhao et al. | |

OTHER PUBLICATIONS

Yoon, Hobin, et al., "Attribute-Based Partial Geo-Replication System", IC2E 2016, Berlin, Germany, Apr. 4-6, 2016, pp. 127-130.*

Kernighan, Brian W., et al., The C Programming Language, Prentice-Hall Software Series, Prentice-Hall, Inc., Englewood Cliffs, NJ © 1978, pp. 3-4, 11-12, 16-17, 51, 56-60 and 202.*

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Non-Final Office Action dated Feb. 21, 2020 for related U.S. Appl. No. 16/200,470.

Cano, I. et al., "Curator: Self-Managing Storage for Enterprise Clusters", 14th Usenix Symposium on Networked Systems Design and Implementation, NSDI '17, (Mar. 27, 2017).

International Search Report dated Feb. 14, 2019 for corresponding PCT Patent Application No. PCT/US18/62669.

International Preliminary Report dated Jan. 6, 2020 for corresponding PCT Patent Application No. PCT/US18/62669.

Non-Final Office Action dated Mar. 19, 2020 for related U.S. Appl. No. 16/200,502.

Microsoft, "Volume Shadow Copy Service", (Sep. 3, 2014), from https://docs.microsoft.com/en-us/previous-versions/windows/it-pro/windows-server-2008-R2-and-2008/ee923636(v=ws.10).

VMWARE, "Using Storage vMotion to migrate a virtual machine with many disks timeout (1010045)", (Last Updated Feb. 19, 2014).

Non-Final Office Action dated Jun. 11, 2020 for related U.S. Appl. No. 16/201,258.

Non-Final Office Action dated Aug. 11, 2020 for U.S. Appl. No. 16/201,826, 9 pages.

Final Office Action dated Sep. 10, 2020 for related U.S. Appl. No. 16/200,470, 20 pages.

Final Office Action dated Sep. 29, 2020 for related U.S. Appl. No. 16/200,502, 30 pages.

Notice of Allowance dated Nov. 4, 2020 for related U.S. Appl. No. 16/201,258, 7 pages.

Non-Final Office Action dated Jan. 6, 2021 for related U.S. Appl. No. 16/200,470, 23 pages.

Final Office Action dated Jan. 11, 2021 for U.S. Appl. No. 16/201,826, 7 pages.

(56) References Cited

OTHER PUBLICATIONS

Non-Final Office Action dated Jan. 26, 2021 for related U.S. Appl. No. 16/200,502, 35 pages.
Advisory Action dated Mar. 19, 2021 for U.S. Appl. No. 16/201,826, 3 pages.
Notice of Allowance dated Apr. 15, 2021 for U.S. Appl. No. 16/201,826, 17 pages.

* cited by examiner

USING SNAPSHOTS TO ESTABLISH OPERABLE PORTIONS OF COMPUTING ENTITIES ON SECONDARY SITES FOR USE ON THE SECONDARY SITES BEFORE THE COMPUTING ENTITY IS FULLY TRANSFERRED

RELATED APPLICATIONS

The present application claims the benefit of priority to U.S. Patent Application Ser. No. 62/591,115 titled "USING SNAPSHOTS TO ESTABLISH OPERABLE PORTIONS OF COMPUTING ENTITIES ON SECONDARY SITES FOR USE ON THE SECONDARY SITES BEFORE THE COMPUTING ENTITY IS FULLY TRANSFERRED", filed on Nov. 27, 2017, which is hereby incorporated by reference in its entirety.

FIELD

This disclosure relates to data replication, and more particularly to techniques for using snapshots to establish operable portions of computing entities on secondary sites for use on the secondary sites before the computing entity is fully transferred.

BACKGROUND

For purposes of maintaining a "backup copy" or for use in disaster recovery scenarios, data replication techniques send data from an originating site to a remote site. When using certain data replication techniques, data is sent from a first site to a second site as a series of computing entities (e.g., files, volumes, virtual disks, etc.). When a particular computing entity has been received in its entirety at the remote site, the computing entity is tagged (e.g., with a timestamp), catalogued (e.g., into a folder or director or database table), and saved to persistent storage for later use in case of a disaster at the originating site or in case of some other reason to restore from the persisted computing entities.

Often, telecommunications are used to transfer many terabytes of data from an originating site to a remote site. Communication of so much data over telecommunications links often takes many hours. However, in certain scenarios, a user might want to access the computing entity or computing entities for reasons other than disaster recovery. For example, even before a particular computing entity has been transferred in its entirety to the remote site, a user might want to begin some analysis or begin post-processing or perform some other actions on some portion or portions of the computing entity at the remote site.

Unfortunately, when using legacy data replication techniques, users must wait until the data has been fully replicated at the remote site before being able to begin taking action on the replicated data. For example, a file that is in the process of being communicated to a remote site might not even be catalogued in the file directory of the remote site until all of the contents of the file in its entirety has been completely received and catalogued at the remote site. This problem of long wait times is exacerbated as the amount or size of computing entities being replicated to the remote site get larger and larger, thus incurring longer and longer wait times for the computing entity to be received in its entirety at the remote site. For very large files or computing entities, the waiting period can become prohibitively long. What is needed is a mechanism to relieve the user or process from having to wait for the entirety of a computing entity to be received at the remote site before beginning processing over the computing entity at the remote site.

SUMMARY

The present disclosure describes techniques used in systems, methods, and in computer program products for using snapshots to establish operable portions of computing entities on secondary sites for use on the secondary sites before the computing entity is fully transferred, which techniques advance the relevant technologies to address technological issues with legacy approaches. More specifically, the present disclosure describes techniques used in systems, methods, and in computer program products for using snapshots to communicate operable portions of computing entities from an originating site to a secondary site for use on the secondary sites before the computing entity is fully transferred. Certain embodiments are directed to technological solutions for managing access to partially replicated computing entities at a remote site even before the computing entity has been fully replicated at the remote site.

The disclosed embodiments modify and improve over legacy approaches. In particular, the herein-disclosed techniques provide technical solutions that address the technical problems of long wait times before a replicated computing entity can be used by a user process at a replication site. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high performance computing as well as advances in various technical fields related to distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
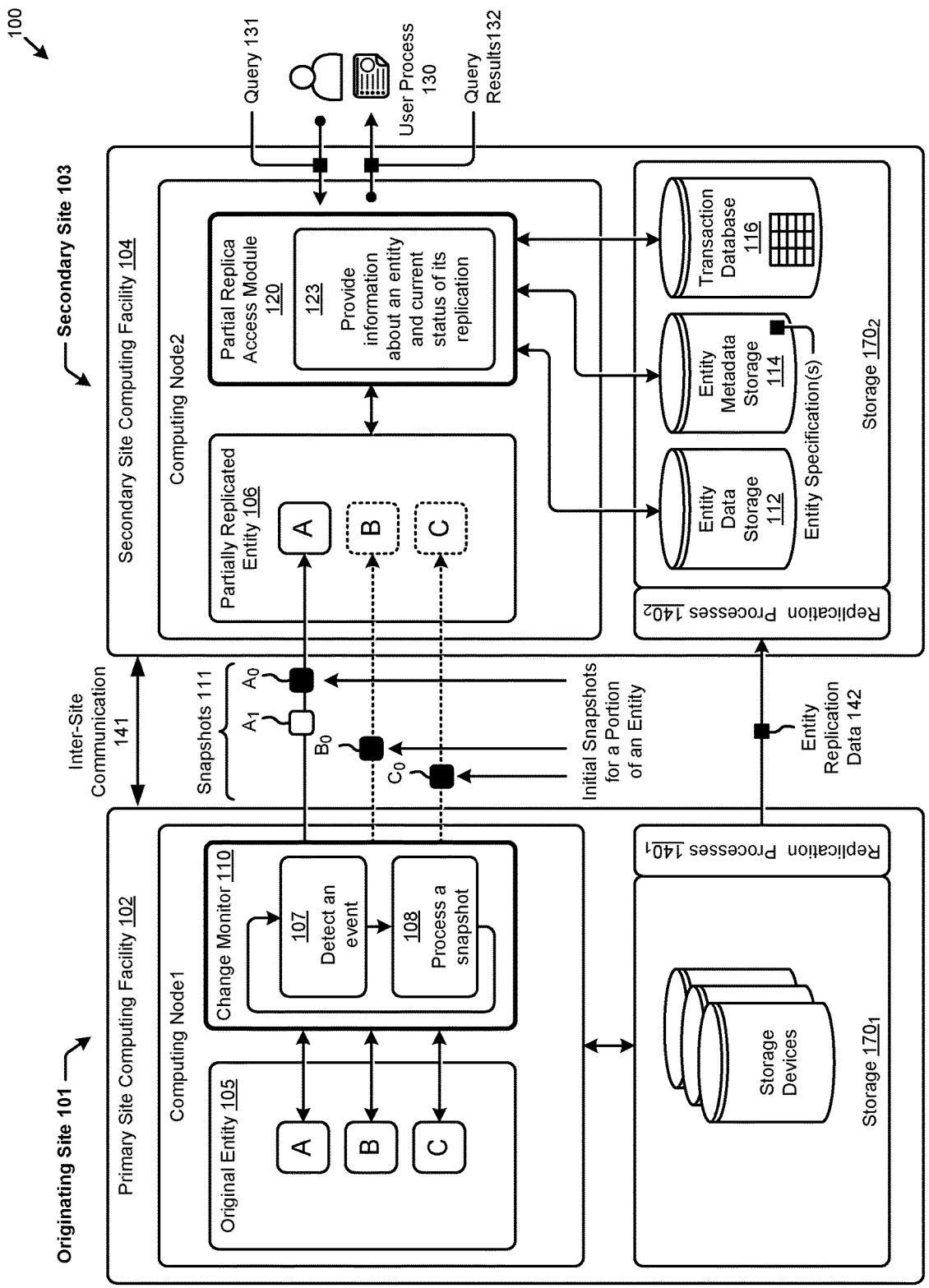
FIG. 1 depicts an environment having an originating computing site, a secondary computing site, and a mechanism for communication between the two sites, according to an embodiment.

Embodiments in accordance with the present disclosure address the problem of long wait times before a replicated computing entity can be used by a user process at a replication site. Some embodiments are directed to approaches for managing access to partially replicated computing entities at a remote site even before the computing entity has been fully replicated at the remote site. The accompanying figures and discussions herein present example environments, systems, methods, and computer program products for using snapshots to communicate operable portions of computing entities from an originating site to one or more secondary sites for use on the secondary sites before the computing entity is fully transferred.
Overview Disclosed herein are mechanisms by which a small portion or "shell" or "container" of a computing entity can be created on a remote site, where the shell or container has sufficient information in it (or associated with it) such that a user process can begin processing with just the shell or container even while additional data that fills-out the contents of the shell is being replicated to the remote site.

At an early moment during remote site replication processing, a selected series of snapshots that convey a portion of the computing entity to be replicated can be transmitted from the originating site to one or more remote sites. In accordance with the herein-disclosed techniques, even while the potentially very long process of replication of a large computing entity to a remote site is being carried out, a user process can operate on the portions that are available at the remote site as a result of remote site receipt of one or more of the aforementioned snapshots.

A first agent at the originating site determines the contents and sequence of a selected series of snapshots that convey a portion of the computing entity to be replicated to a remote site. A second agent at the remote site receives the series of snapshots, then updates a transaction database and a metadata repository such that a process on the remote site can, at any moment in time, determine the then-current state of the constituency of the computing entity. A user process at the remote site can emit a query to an agent that reports the then-current state of the constituency of the computing entity. The user process can then initiate performance of certain operations over the partially-received computing entity.

Changes to the computing entity that might occur at the originating site during the time that actual data is being replicated to the remote site are monitored by a change monitoring agent. Such changes are captured periodically and transmitted to the remote site in a series of snapshots. As one example of this, a set of sales records from a recent period can be post-processed at a remote secondary site (e.g., to use the sales records to calculate sales commissions). The post-processing that occurs at the secondary site can begin immediately even when only a very few sales records from the recent period have been sent to the remote site. If changes are made to the original sales records at the originating site (e.g., applying corrections or cancellations) such that the changes affect any portion of the sales records, those changes are delivered to the remote site as a snapshot. Snapshots are small relative to the entire set of sales records, so snapshots can be sent at a relatively high frequency.

Replication of the entire set of sales records can continue even while the snapshots are being transferred from the originating site. A requested access by a user process at a remote secondary site can be at least partially satisfied by applying as many snapshots are as needed to bring the accessed portion into synchrony with the changes that were monitored and captured at the originating site. When the entirety of the set of sales records has been replicated at the secondary site, a user process that emits a query to determine the then-current state of the set of sales records will receive a query response that the sales records have been replicated in their entirety at the secondary site.

As another example, in a virtualized system having virtual machines, virtual disks (vDisks), virtual network interfaces (vNICs), and other virtualized entities, a user process can begin operations with only a relatively small portion of such virtualized entities. As such, in various embodiments, the originating site and at least one secondary site cooperatively transfer snapshot replications of portions of the virtual entities from the originating site to the secondary site(s). Continuing the example, the "shell" of a virtual disk can be transferred to the secondary site, and even before the contents of the virtual disk is replicated to the secondary site, a non-replication process can access the "shell" of the entity corresponding to the snapshot replications and begin at least some processing using the "shell" of the virtual disk.

Such a non-replication process can proceed while the replication processes continue to perform replication of the entity or entities from the originating site to the secondary site. As the replication processes continue to populate the secondary site's copy of virtual disk(s) with successively more content from the originating site's virtual disk(s), the non-replication process can process the incoming contents of the secondary site's virtual disk as they arrive. Specifically, the non-replication process can perform a query at any time so as to retrieve information about any given entity. The query returns query results that include the then-current information pertaining to the replication status of the queried entity. One advantage of allowing a non-replication user process to begin operations over a computing entity—even when only a relatively small portion of the computing entity has been replicated—is that such early access reclaims a significant amount of time (e.g., for a user process) that would otherwise have been lost while waiting for the computing entity to be fully replicated and catalogued at the secondary site. Systems that provide this capability are in sharp contrast to replication techniques that do not allow a non-replication process (e.g., a user process) to begin operations until the entire computing entity has been replicated and catalogued. As used herein, a non-replication process is a virtual machine or executable container or thread that operates on portions of a partially-replicated entity even though one or more other concurrently running processes, virtual machines, or executable containers continue to pursue copying of the entity from the originating site to the secondary site.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

The herein-disclosed techniques provide technical solutions that address the technical problems attendant to users having to endure long wait times before a replicated computing entity can be used by a user process at a replication site. Such technical solutions relate to improvements in computer functionality. More specifically, the techniques disclosed herein, as well as use of the data structures as disclosed, serve to make the computing systems perform better. In particular, during replication processing, user processes can initiate one or more non-replication processes that operate on portions of data (e.g., as received in relatively small snapshots) while the replication processes continue to perform replication of data (e.g., of relatively larger extents of data) from the originating site to the secondary site.

FIG. 1 depicts an environment 100 having an originating computing site, a secondary computing site, and a mechanism for communication between the two sites. As an option, one or more variations of environment 100 or any aspect thereof may be implemented in the context of the architecture and functionality of the embodiments described herein.

As shown, the environment 100 includes a primary site computing facility 102, a secondary site computing facility 104, and a mechanism for inter-site communication 141. The originating site comprises computing entities that are formed of several constituent portions where some and/or all of such portions can be operated over at the secondary site, even before the computing entity has been replicated in its entirety. Disaster recovery operations such as replication of computing entities are carried out between the primary site computing facility and the secondary site computing facility. As heretofore mentioned there are many computing scenarios where it is desirable to begin processing at the secondary site, even before a particular computing entity has been replicated in its entirety at the secondary site. This is shown in FIG. 1 as pertains to the shown user and/or user process 130 being able to perform a query and receive results that indicate the status of the replication of an entity or portion thereof. To accomplish this, a user process issues a query and receives query results even before the data has been fully replicated in its entirety at the secondary site. To do so, the user or user process interacts with the partial replica access module 120. The partial replica access module is configured to access storage at the secondary site so as to be able to provide information about an entity and its current status of replication. Thus, the user process 130 might issue a query to find out the replication status of portion 'A'. If the query results indicate that portion 'A' has been at least partially replicated, then user process 130 can begin processing the partially replicated contents of portion 'A' of the partially replicated entity.

As depicted, replication processes carry out replication of data on an ongoing basis so that other portions of the partially replicated entity, such as portion 'B' and portion 'C', may be in the process of being replicated. At some next moment in time, user process 130 can issue another query, and this time, the query results might indicate that portion 'B' is "accessible but not yet complete", and thus, user process 130 might determine to initiate processing over portion 'B' even though it is not yet complete. User process 130 can issue queries at any moment in time to get a then-current status of the ongoing replication between the originating site and the secondary site, however, it can happen that any original entity or portions thereof might be changed by processing at the primary site. To keep the partial replica access module substantially up-to-date with respect to changes to an entity at the originating site, a change monitor 110 detects change events over any portion of the entity at the originating site. If and when there is a detected change, metadata pertaining to certain types of changes of the changed entity and/or a snapshot pertaining to the data changes of the changed entity are sent to the secondary site. The secondary site receives such metadata and/or changed data in the form of a series of snapshots 111 (e.g., the shown snapshots $A_0$, and $A_1$, etc.) and in turn, repeatedly updates entity data storage 112, and/or entity metadata storage 114 and/or makes updates to the transaction database 116.

The mechanism for inter-site communication 141 is used to communicate a series of snapshots 111 from the primary site computing facility 102 to the secondary site computing facility 104. The same mechanism or a different mechanism for inter-site communication is used to communicate data (e.g., entity replication data 142) from a computing node (e.g., computing node1) of the primary site computing facility 102 to a computing node (e.g., computing node2) of the secondary site computing facility 104. A protocol for communication of data from the primary site computing facility to the secondary site computing facility is carried out by the replication processes 1401 that accesses storage devices of storage $170_1$, and which replication processes $140_1$ of the shown originating site 101 cooperate with replication processes 1402 of the secondary site 103 to store replication data into locations within storage $170_2$.

The secondary site might be a remote site that is situated a long distance from originating site 101. Alternatively, in some embodiments, the secondary site might be situated a short distance from originating site 101. In this latter case, the inter-site communication might be a short-haul Ethernet or Fibre Channel backplane. In either case, replication is accomplished by making a copy of data from a storage location at one computing facility (e.g., storage $170_1$) to storage at another computing facility (e.g., storage $170_2$). The storage at originating site 101 might comprise entity data, and/or might comprise entity metadata, and/or might comprise a transaction database, the content of any of which might be subjected to replication.

During the course of replication, entity replication data 142 from any originating source is communicated from the originating site to the secondary site. Concurrently, snapshots of data are being sent from locations at the originating site computing facility to locations at the secondary site computing facility. Such snapshots comprise an initial snapshot comprising initial metadata and an initial data state of a particular entity or portion thereof (e.g., initial snapshot $A_0$, initial snapshot $B_0$, initial snapshot $C_0$) and subsequent snapshots that include indications of changing portions of the particular entity. In this example, the particular original entity 105 comprises portions 'A', 'B', and 'C', as shown.

A change monitor 110 detects an event such as a replication initiation event or a change event (step 107) and processes one or more snapshots accordingly (step 108). As shown, an initial replication initiation event might be detected by change monitor 110, which might in turn process a snapshot in the form of the shown initial snapshot $A_0$ comprising entity metadata and a series of data blocks. At another moment in time, a change event might be detected by change monitor 110, which might in turn process a snapshot in the form of the shown snapshot $A_1$, which might comprise a series of data blocks and/or a series of I/O commands to be applied over a series of data blocks.

On an ongoing basis, further changes might be detected by change monitor 110, which might in turn process further snapshots. In the same scenario, the change monitor might process a snapshot that comprises data in the form of a current set of instructions to be received and processed by the secondary site. This is exemplified by the initial snapshot labeled snapshot $B_0$. In the same scenario, the change monitor might process a snapshot that comprises data in the form of a virtual disk to be received and processed by the secondary site. This is exemplified by the initial snapshot labeled $C_0$.

At the moment in time when the metadata of initial snapshot $A_0$ has been processed at the secondary site by computing node2, original entity 105 exists at the secondary site as merely a partially replicated entity 106 that is populated with only the portion identified as portion 'A'. At that moment in time, and as shown, the portion identified as portion 'B' and the portion identified as portion 'C' have not yet been populated.

When operating in accordance with the herein-disclosed techniques, even though the entirety of original entity 105 has not yet been fully replicated, portions that are available in the partially replicated entity (e.g., the portion identified as portion 'A') can be accessed by user process 130. Such a user process 130 can perform as much or as little processing over the portion identified as portion 'A' as is deemed possible by the user process. In some cases, a user process 130 will operate over the portion identified as portion 'A' and stop. In other cases, the user process might want to be informed of changes to the portion identified as portion 'A'. Such changes can arise from processing at the originating site, where some aspect of the portion identified as portion 'A' is changed, thus raising an event that precipitates processing of a snapshot (e.g., snapshot $A_1$), which in turn is applied to the portion identified as portion 'A' of the partially replicated entity 106.

A partial replica access module 120 serves to provide information about an entity (process 123). More specifically, any one or more instances of the aforementioned user process 130 can form a query 131 to request information about an entity such as the then-current state of replication of the corresponding entity. Such a query can be received by partial replica access module 120 and processed to formulate query results 132, which are then returned to the user process 130.

In this example, after application of snapshot "$A_1$", the then-current state of partially replicated entity 106 might be, "portion 'A' is in a complete data configuration and is updated as of time T=T1". An indication of such a then-current state can be codified into the query results and returned to the caller. At a later moment, after other snapshots have been processed (e.g., for example at time T=T2), user process 130 might query again. The corresponding query results 132 would indicate that the then-current state of partially replicated entity 106 is that "portion 'A' is complete and is updated as of time T=T2".

As shown, partial replica access module 120 can carry out steps to persist any information about an entity. In the embodiment shown, partial replica access module 120 stores and retrieves information to/from entity data storage 112, entity metadata storage 114, and/or a transaction database 116. Also, replication processes 1402 can store and retrieve information to/from entity data storage 112, and/or to/from entity metadata storage 114, and/or to/from transaction database 116. As such, partial replica access module 120 responds to a caller by providing various information about a particular entity and the then-current status and/or aspects of its replication. For example, a partial replica access module 120 can respond to a caller by providing an indication of availability of data (e.g., blocks of a virtual disk) or metadata (e.g., entity attributes) of the particular entity, as well as the extent of the replication of the particular entity with respect to a respective entity specification.

User process 130 can be any process that seeks to initiate operation on only a partially replicated entity. The scope of what is carried out by user process 130 depends on the developer of the algorithm that is embodied by user process 130. Strictly as an example, original entity 105 might include portions 'A', 'B', and 'C' that are database tables, namely "tableA", "tableB", and "TableC". Some user process algorithms can operate over just "tableA". Some algorithms use two or more tables, such as when performing a JOIN operation. A query by a user process to partial replica access module 120 might be satisfied in a response that indicates that both "tableA" and "tableB" are complete and up to date as of some particular time, and that the user process can take action over both "tableA" and "tableB".

Strictly as another example, original entity 105 might be a video file that is divided into an "Intro" (e.g., portion 'A'), a first chapter (e.g., portion 'B'), and a last chapter (e.g., portion 'C'). As yet further examples, original entity 105 might correspond to a virtual machine having constituents in the form of a virtual disk, a virtual network interface, etc. Still further, original entity 105 might correspond to an application comprising one or more virtual machines and one or more application components such as an SQL application, an SQL database, SQL scripts, etc.

As can be understood by one skilled in the art, the time reclaimed by access to a portion of an entity can be very significant. Table 1 depicts several example scenarios where early access to a partially replicated entity by a user process is provided thousands of time units earlier than if the user process had to wait for the entire replication process to complete.

TABLE 1

Example time reclamation

| Entity/Subcomponent | Flags | Time Needed to Replicate | Time Started | Early Access Time |
|---|---|---|---|---|
| Entity Data Preamble | — | 1 | 0 | 1+ |
| Entity Data Structure 1 | F1 | 3 | 1 | 4+ |
| Entity Range 1 | [F1, F2] | 400 | 1 | 401+ |
| Entity Range 2 | — | 1600 | 400 | 2000+ |
| Entity Range 3 | — | 10 | 1 | 11 |
| Entire Entity | — | 2014 | 0 | 2014+ |

Figure 2:
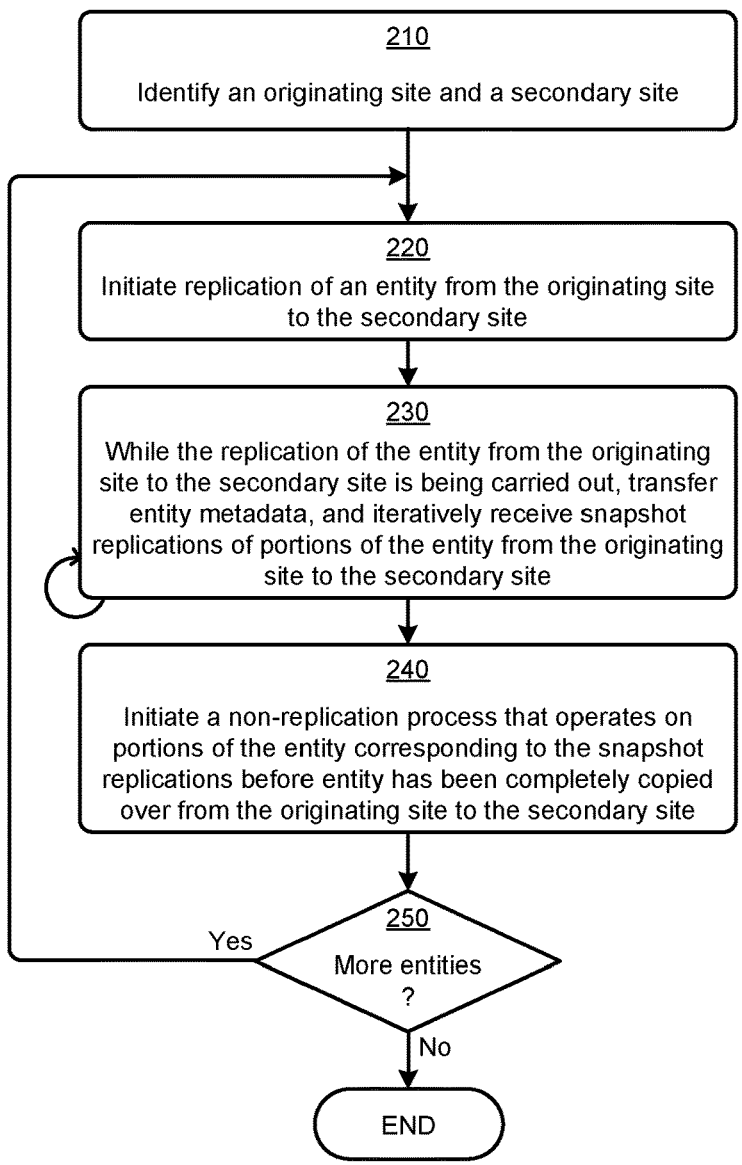
FIG. 2 is a flowchart that depicts a replication technique that uses snapshots to communicate operable portions of computing entities from an originating site to a secondary site for use on the secondary site before the computing entity is fully transferred, according to an embodiment.

FIG. 2 is a flowchart that depicts a replication technique 200 that uses snapshots to communicate operable portions of computing entities from an originating site to a secondary site for use on the secondary site before the computing entity is fully transferred. As an option, one or more variations of replication technique 200 or any aspect thereof may be implemented in the context of the architecture and functionality of the embodiments described herein. The replication technique 200 or any aspect thereof may be implemented in any environment.

The shown embodiment commences upon identifying an originating site and a secondary site (step 210). The originating site comprises computing entities that are formed of several constituent portions where some and/or all of such portions can be operated over at the secondary site, even before the computing entity has been replicated in its entirety. Step 220 serves to initiate the replication processes that carry out replication of the original entity from the originating site to the secondary site. Step 230 iterates during replication. Specifically, while the replication of the entity from the originating site to the secondary site is being carried out, at least one of the aforementioned replication processes iteratively receives snapshot replications of portions of the entity from the originating site.

At step 240, a non-replication process begins to operate on portions of the entity corresponding to the snapshot replications—even though the entity from the originating site has not been fully replicated at the secondary site. The non-replication process operates on portions of the partially-replicated entity even though the replication processes continue to pursue replication of the entity from the originating site to the secondary site. More specifically, the non-replication process might carry out non-replication tasks such as processing a file, or processing records in a database, or performing virus detection, etc. This non-replication processing can be performed concurrently with the replication tasks that continue. Furthermore, the non-replication processing proceeds without interacting with the replication tasks. Instead, the non-replication processing augments the replication processing.

The replication tasks are carried out asynchronously with respect to the non-replication processing. The non-replication processing can start and/or stop completely independently of any ongoing replication processing. Still more, non-replication processing can frequently determine the state of replication, and can initiate additional non-replication processing based on the status of the replication process and/or the status (e.g., progress/completeness) of the replicated data.

Decision 250 determines if there are more entities to be replicated to the secondary site, and if so, the "Yes" branch of decision 250 is taken; otherwise, the "No" branch of decision 250 is taken and the replication process ends.

The processing that is carried out by change monitor 110 of FIG. 1 is described in the following FIG. 3.

Figure 3:
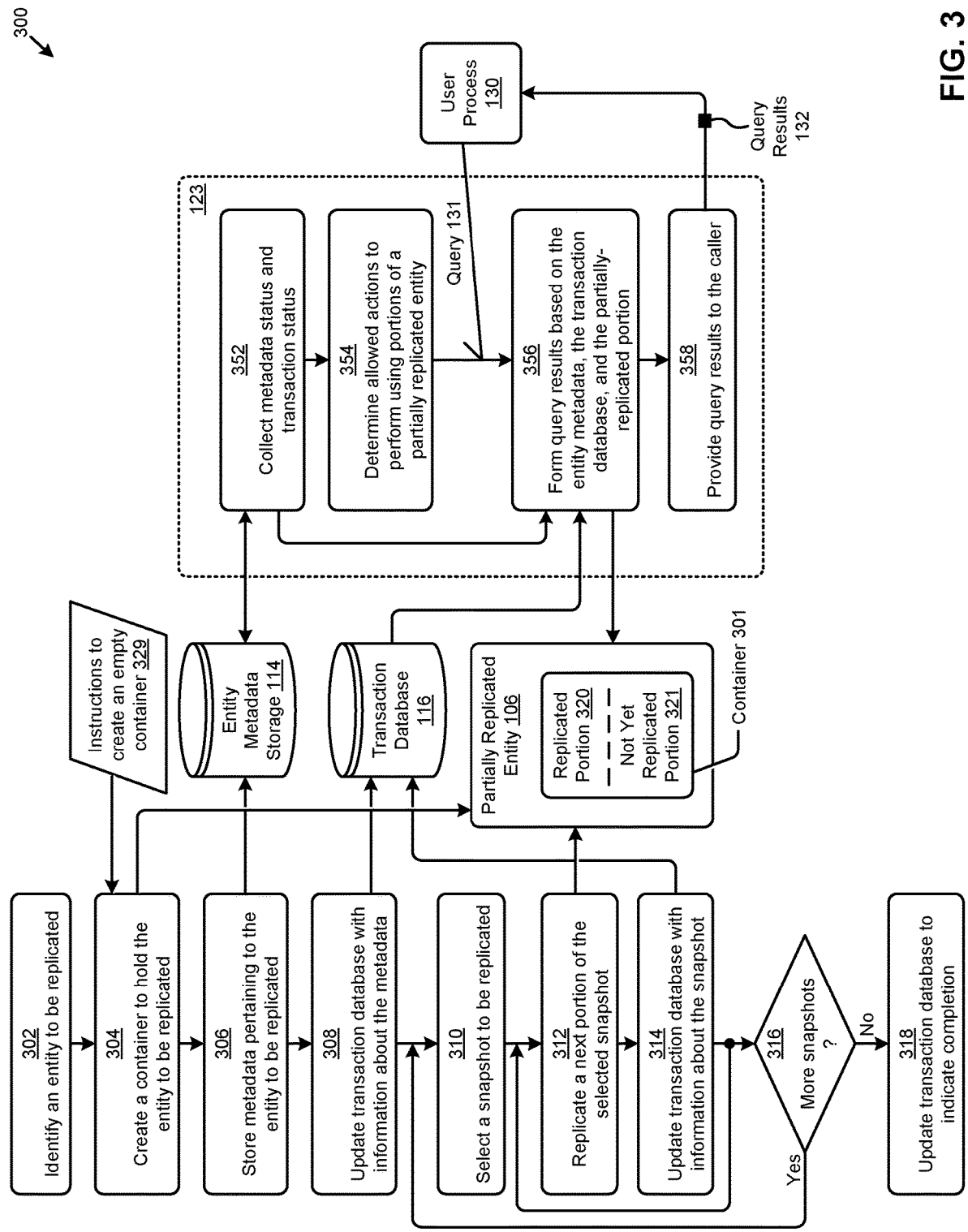
FIG. 3 is a dataflow diagram that depicts certain originating site snapshotting processes that use snapshots to communicate operable portions of computing entities from an originating site to a secondary site for use on the secondary site before the computing entity is fully transferred, according to an embodiment.

FIG. 3 is a dataflow diagram 300 that depicts certain originating site snapshotting processes that use snapshots to communicate operable portions of computing entities from an originating site to a secondary site for use on the secondary site before the computing entity is fully transferred.

As shown, the snapshotting processes commence when an entity to be replicated is identified (step 302). Referring to FIG. 1, such identification can occur in replication processes 1402, or in partial replica access module 120, or any combination. At step 304, a container 301 to hold the identified entity is created. As an example, an action within step 304 issues one or more instructions to create an empty container 329 in the storage area shown as partially replicated entity 106. As time progresses, such a container will serve as an area for the replicated portion 320 of the entity being replicated as well as an area that is labeled as a not yet replicated portion 321. As communication continues between the originating site and the secondary site, step 306 serves to store metadata pertaining to the entity to be replicated. As shown, such metadata is stored into entity metadata storage 114. As used herein, entity metadata is any codification of any property or characteristic of a computing object. In some cases, metadata is included in replication data for a computing entity. Entity metadata can be stored in persistent storage and can be accessed by a query.

As communication continues between the originating site and the secondary site, step 308 serves to update transaction database 116. As early as the completion of the operations of step 306, process 123 is able to begin processing certain aspects of a partially replicated entity. Specifically, step 352 of process 123 can collect metadata status and transaction status (if any) from the entity metadata storage and from the transaction database. Based on the information retrieved in step 352, step 354 serves to determine a set of allowed actions that can be performed using only the portions of the partially replicated entity that have been stored into the replicated portion 320.

As shown, process 123 is able to respond to a query 131 from a user process 130. Specifically, upon occurrence of a query 131, step 356 commences to form query results based on the entity metadata and the transaction status as was collected in step 352. In some cases, query results can include information pertaining to aspects of the partially replicated entity as is available from the contents and/or form of replicated portion 320, and/or from the contents and/or form of the not yet replicated portion 321. Query results 132 are provided to the caller (step 358).

During the execution of process 123, a replication loop is entered and snapshots of the entity to be replicated are sent from the originating site to the secondary site. Specifically, and as shown, step 310 serves to select a snapshot to be replicated and then enter an iteration loop wherein step 312 serves to replicate a next portion of the selected snapshot, and step 314 serves to update the transaction database 116 to reflect that the next portion that was received in step 312 has been replicated into replicated portion 320. In many situations, an update of the transaction database might include storing an indication of a timestamp, and/or a sequence number, and/or a record number. Such indications can be used by process 123 to determine allowed actions that can be taken over the contents of the partially replicated entity 106.

As time progresses, and as activities that affect the entities at the originating site continue, there may be more snapshots available for replication. As such, decision 316 serves to determine if more snapshots are available and, if so, the "Yes" branch of decision 316 is taken and a next snapshot is selected (step 310) for processing in the replication loop. At a moment in time when there are no pending snapshots available, the "No" branch of decision 316 is taken, after which step 318 serves to update the transaction database to signal moment-in-time completeness of processing incoming snapshots for the entity being replicated. It can happen that more snapshots become available at a later moment in time. As such, any of the steps shown in dataflow diagram 300 can execute again so as to bring over additional snapshot data from the originating site to the secondary site.

FIG. 4A, FIG. 4B, FIG. 4C, and FIG. 4D depict a scenario 400 for using metadata at a secondary site for accessing a partially replicated computing entity before the computing entity is fully transferred to a secondary site.

Figure 4A:
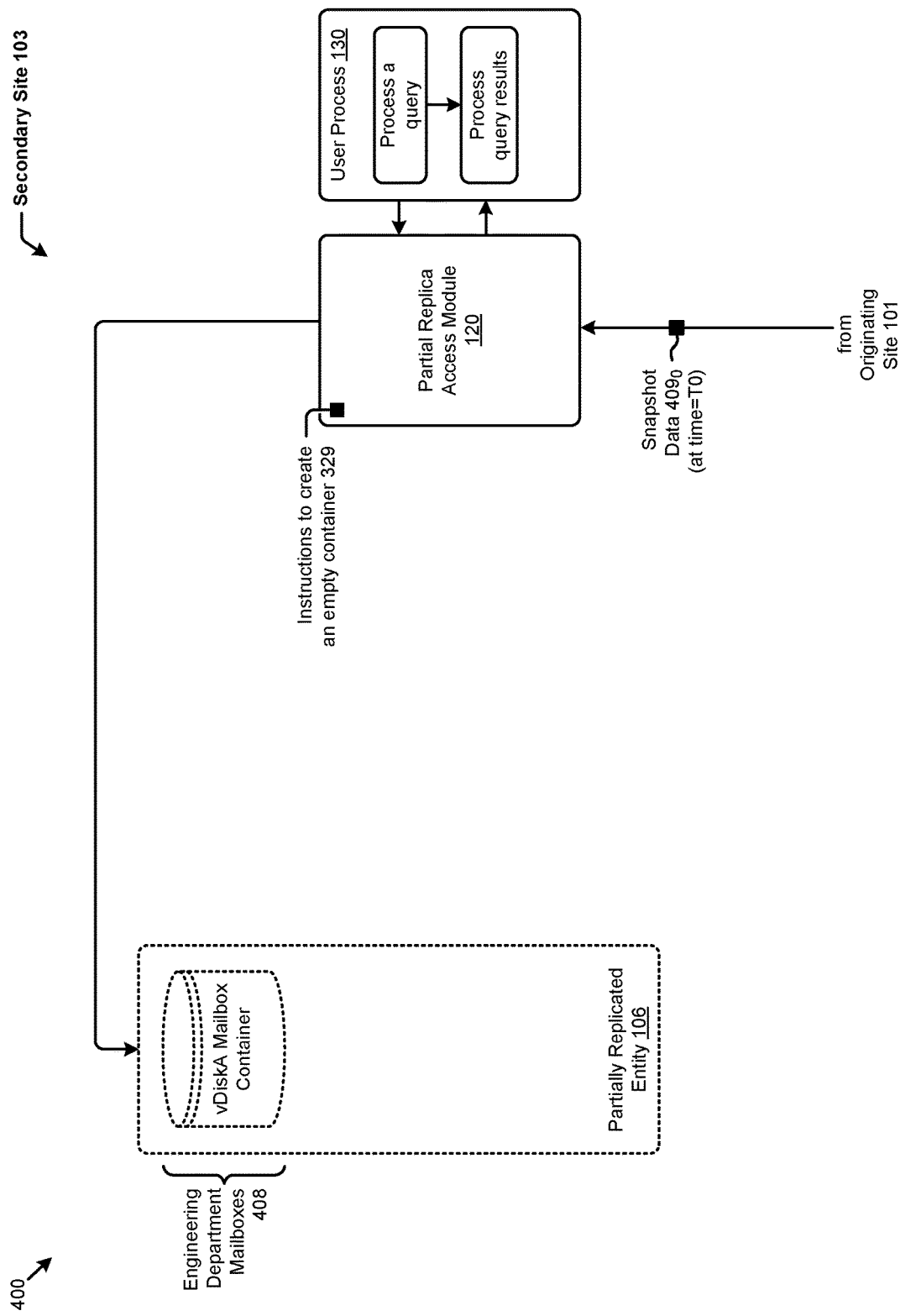
FIG. 4A, FIG. 4B, FIG. 4C, and FIG. 4D depict a scenario for using metadata at a secondary site for accessing a partially replicated computing entity before the computing entity is fully transferred to a secondary site, according to an embodiment.

FIG. 4A shows a partial replica access module 120 that receives snapshot data 4090 from originating site 101 at time=T0. Just before time=T0, the partially replicated entity 106 is non-existent. However, upon receipt of snapshot data 4090 from originating site 101, the partial replica access module 120 analyzes at least a portion of the snapshot data 4090 to determine at least enough information to be able to create an empty container to hold one or more entities that are the subject of replication.

In this example, the partial replica access module 120 determines that the created empty container "vDiskA Mailbox Container" is created to be able to hold engineering department mailboxes 408. At this moment in time, none of the contents of the vDiskA mailbox container have been populated at the secondary site, however a user process (e.g., the shown user process 130) can interface with partial replica access module 120. In particular, the user process can formulate a query, issue the query to the partial replica access module 120, and process returned results. At time=T0, the user process might receive query results that indicate (1) there is a container ready to hold engineering department mailboxes 408, and (2) there are no mailbox records yet in the container. However, at time=T0 plus some time increment, the user process might issue a query again, and receive query results that indicate (1) there is a container ready to hold engineering department mailboxes 408, (2) the "total size" of the vDiskA for engineering department mailboxes as well as a number of "total records" in vDiskA, and (3) that there are some mailbox records available in the vDiskA mailbox components 407. This moment in the scenario is shown in FIG. 4B.

Figure 4B:
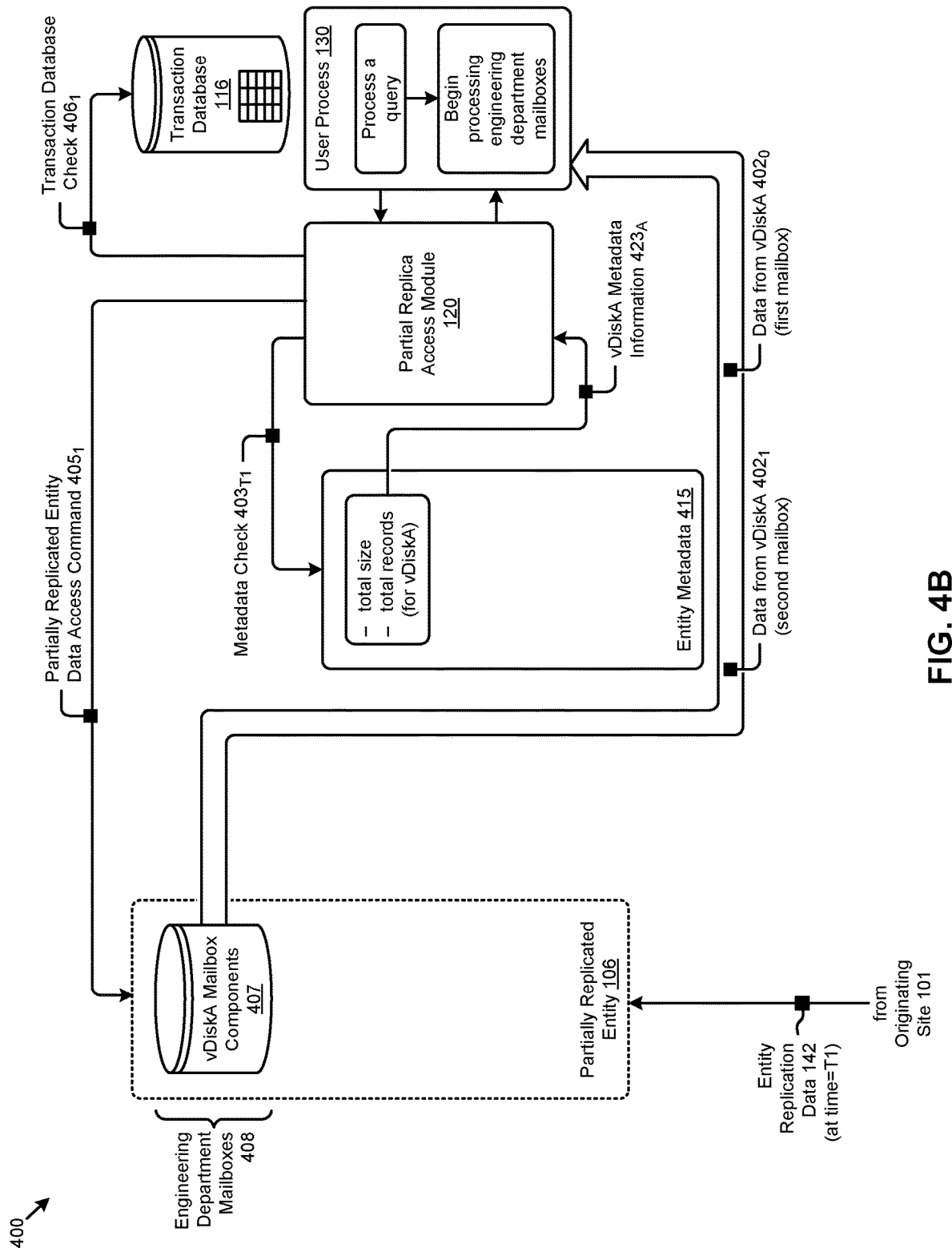

Specifically, FIG. 4B depicts the scenario at time=T1. As shown, partial replica access module 120 performs on behalf of the user process to (1) perform a metadata check $403_{T1}$ of entity metadata 415 and (2) perform a transaction database check $406_1$. In the shown scenario, the replication process between the originating site and the secondary site is being carried out. At time=T1, the replication processing brings over entity replication data 142 comprising two mailboxes. As such, the transaction database 116 now indicates that there is an instance of mailbox data available for access. Furthermore, the entity metadata 415 indicates the size and record count of vDiskA, which information is retrieved by the partial replica access module 120 as metadata information $423_A$.

The user process 130 might query to the partial replica access module 120, and when the user process 130 receives the corresponding query response, it can begin processing the available engineering department mailbox records by accessing (e.g., using the partially replicated entity data access command $405_1$) the partially replicated entity 106 to retrieve data from vDiskA $402_0$, (first mailbox record), and to retrieve data from vDiskA 4021, (second mailbox record). Even though the engineering department mailboxes might comprise hundreds of records, the user process can operate on the available records to perform useful processing over those records, such as checking for viruses, etc. At time=T1, there is only one partially populated vDisk for the engineering department mailboxes; however, at a subsequent moment in time, additional snapshots are received at the secondary site. Also, the replication processes continue to populate contents of partially replicated entity 106. The state of the partially replicated entity 106 at time T=T2 is shown in FIG. 4C.

Figure 4C:
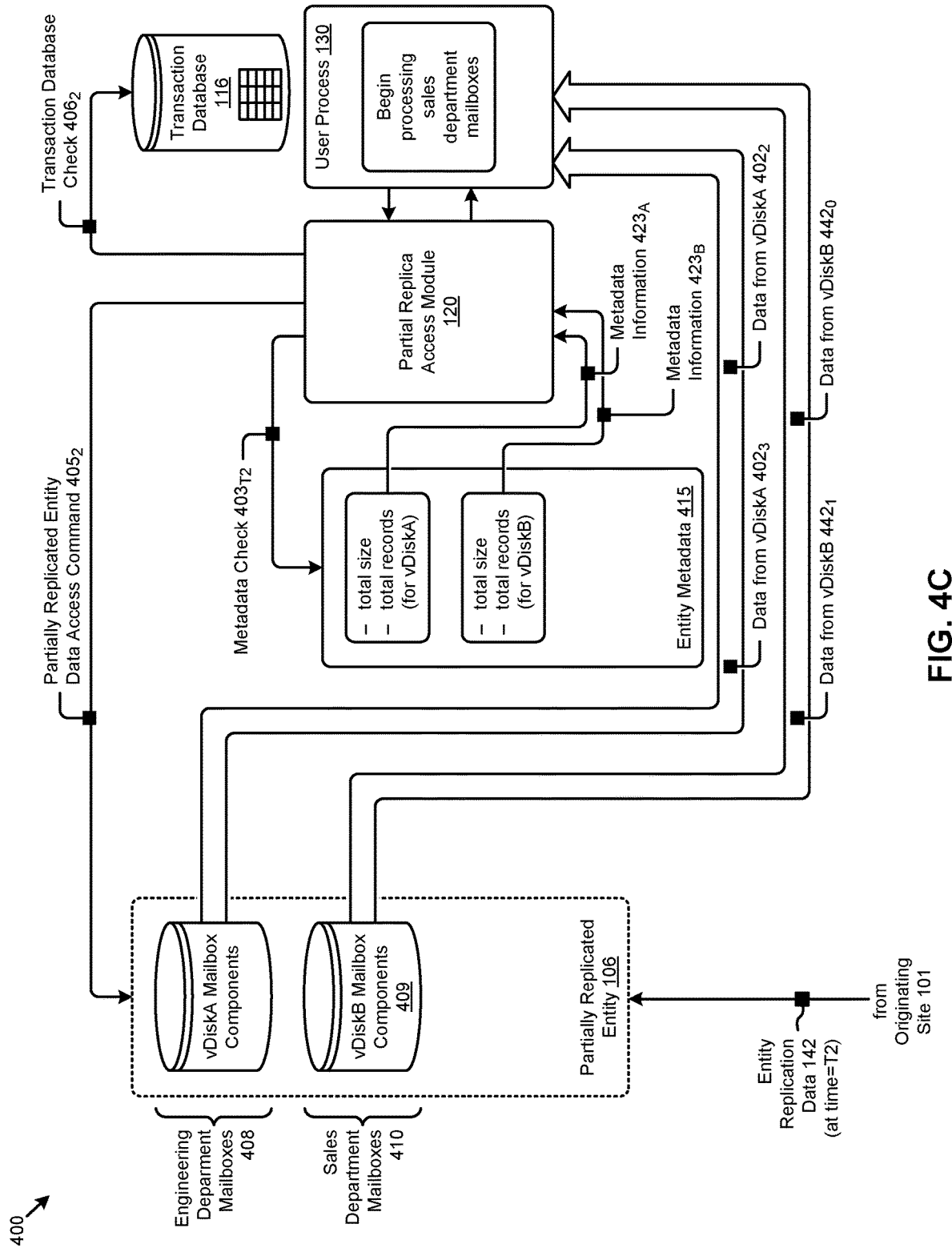

FIG. 4C shows that sales department mailboxes 410 are in the process of being brought over. An occurrence of initial snapshot data pertaining to vDiskB mailbox components 409 causes creation of a container for vDiskB, into which the sales department mailboxes 410 are being populated (e.g., by the occurrence of ongoing snapshots and/or ongoing replication processes).

As shown, vDiskB mailbox components 409 are being populated by entity replication data 142. As such, a query at time=T2 as issued by user process 130 would cause a metadata check $403_{T2}$, (e.g., to access vDiskB metadata) and a transaction database check $406_2$ of transaction database 116. The query could then be satisfied by partial replica access module 120 by returning query results that indicate the then-current states of metadata information $423_A$, metadata information $423_B$, and the indications that result from any transaction database checks.

At this moment at time=T2 plus some time increment, the user process might issue a query, and receive query results that indicate (1) there is a container ready to hold sales department mailboxes 410, (2) the "total size" of the vDiskB for sales department mailboxes as well as a number of "total records" in vDiskB, and (3) that there are some mailbox records available for processing.

When the user process receives the query response, the user process can begin processing sales department mailboxes 410 from vDiskB mailbox components 409 as well any additional incoming engineering department mailbox records. The user process continues processing the available mailbox records by accessing (e.g., using the partially replicated entity data access command $405_2$) the partially replicated entity 106 to retrieve data from vDiskA $402_2$ (a third engineering department mailbox record), data from vDiskA $402_3$ (the fourth engineering department mailbox record), as well as to retrieve data from vDiskB $442_0$ (the first sales department mailbox), and data from vDiskB $442_1$ (the second sales department mailbox record). The state of the partially replicated entity 106 at time T=T3 is shown in FIG. 4D.

Figure 4D:
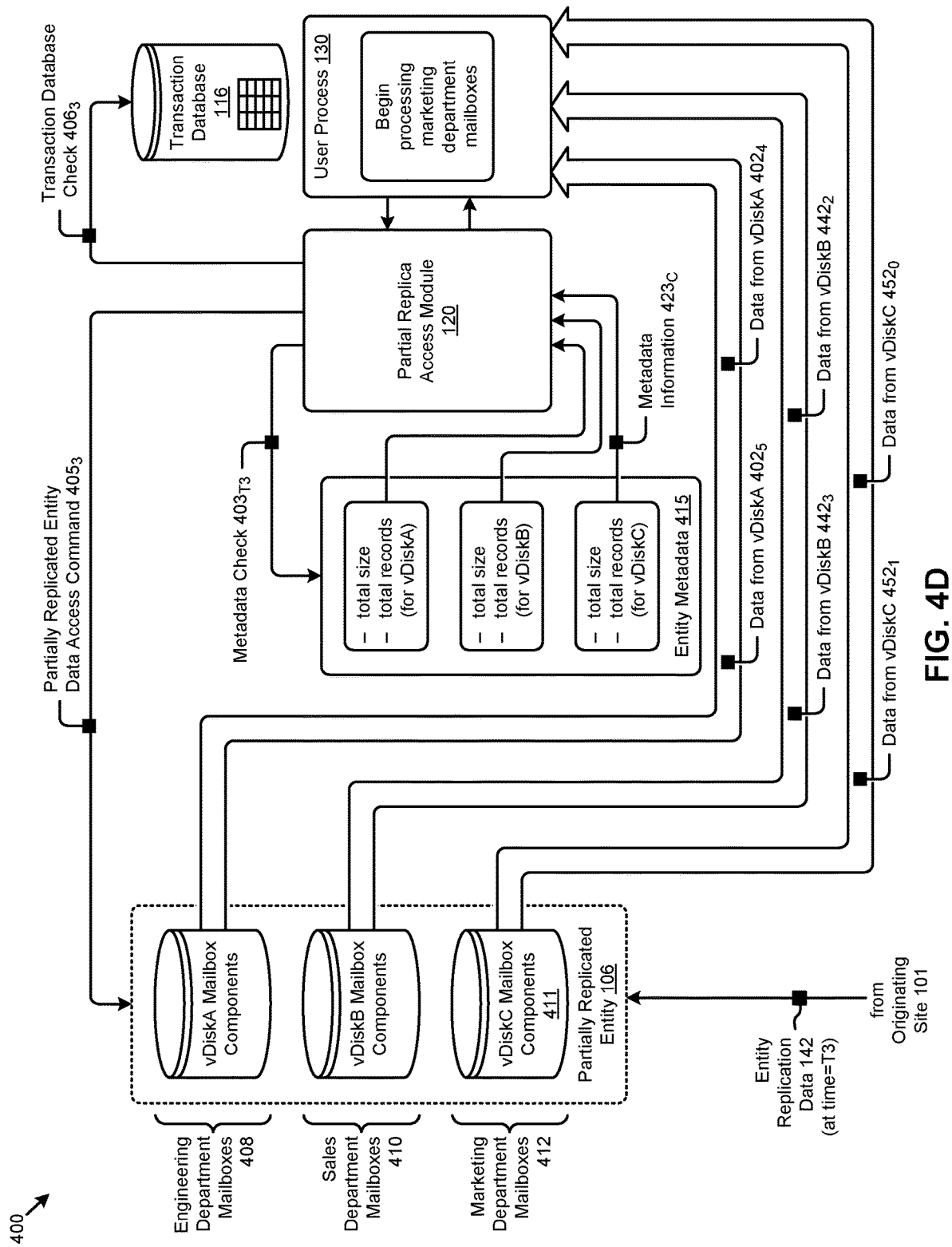

FIG. 4D shows that marketing department mailboxes 412 are in the process of being brought over into the container labeled vDiskC mailbox components 411. After receiving results from a query (e.g., after partial replica access module 120 performs metadata check $403_{T3}$ and transaction database check $406_3$ of transaction database 116) and returning metadata information $423_C$, the user process 130 beings processing the marketing department mailbox records and continues processing the other available mailbox records by accessing (e.g., using the partially replicated entity data access command $405_3$) the partially replicated entity 106 to retrieve data from vDiskA $402_4$ (fifth engineering department mailbox record), data from vDiskA $402_5$ (sixth engineering department mailbox record), as well as to retrieve data from vDiskB $442_2$ (third sales department mailbox record) and data from vDiskB $442_3$ (fourth sales department mailbox record), and as well as to retrieve data from vDiskC $452_0$ (first marketing department mailbox record) and data from vDiskC $452_1$ (second marketing department mailbox record).

In some cases, the snapshots comprise storage I/O (input/output or IO) commands that pertain to logical blocks rather than the data of those logical blocks. In such cases, the storage I/O commands can be "replayed" over some previous backup data so as to apply the changed logical blocks. In some cases, groups of storage I/O commands are amalgamated into a data structure known as a lightweight snapshot.

Further details regarding general approaches to making and using lightweight snapshots are described in U.S. Patent Application Ser. No. 62/591,090 titled "LOSSLESS DATA RESTORE USING MULTIPLE LEVELS OF LIGHT-WEIGHT SNAPSHOTS", filed on Nov. 27, 2017, which is hereby incorporated by reference in its entirety.

Further details regarding general approaches to managing virtual machines are described in U.S. Pat. No. 9,946,569 titled "VIRTUAL MACHINE BRING-UP WITH ON-DEMAND PROCESSING OF STORAGE REQUESTS", issued on Apr. 17, 2018, which is hereby incorporated by reference in its entirety.

Figure 5:
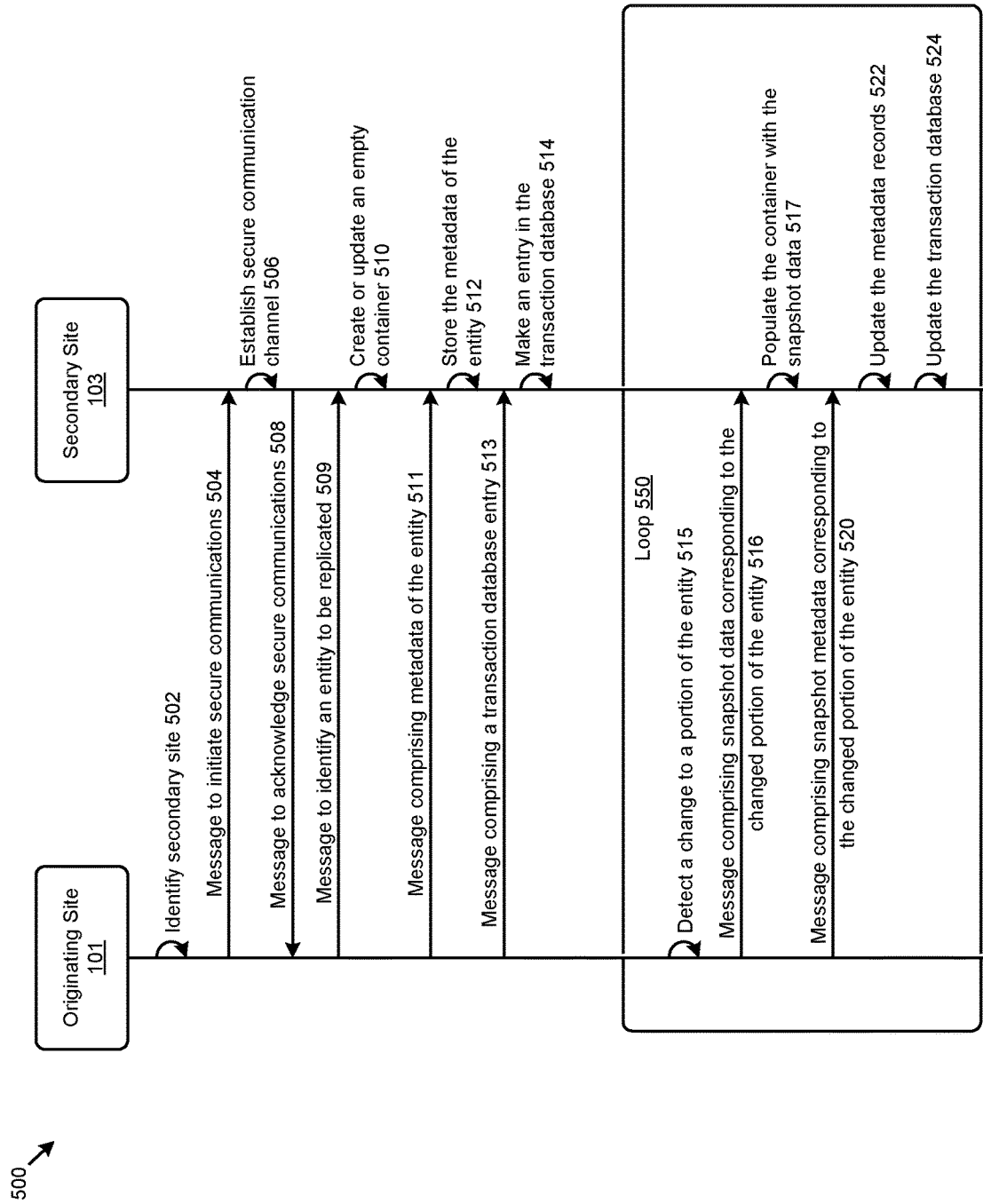
FIG. 5 depicts a snapshot handling protocol for use in systems that communicate operable portions of computing entities from an originating site to a secondary site for use on the secondary site before the computing entity is fully transferred, according to an embodiment.

FIG. 5 depicts a snapshot handling protocol 500 for use in systems that communicate operable portions of computing entities from an originating site to a secondary site for use on the secondary site before the computing entity is fully transferred. As an option, one or more variations of snapshot handling protocol 500 or any aspect thereof may be implemented in the context of the architecture and functionality of the embodiments described herein. The snapshot handling protocol 500 or any aspect thereof may be implemented in any environment.

The embodiment shown in FIG. 5 is merely one example. As shown, the snapshot handling protocol commences when an originating site 101 identifies a secondary site 103 (operation 502). The two sites then exchange one or more messages (message 504) so that a secure communication channel can be established (operation 506). The bidirectional secure communication channel is acknowledged (message 508) and communication between the sites (e.g., for snapshots and for replication data) can commence.

At any subsequent moment in time, the primary site might identify an entity to be replicated (message 509). The secondary site 103 receives the identification of the entity and creates an empty container (operation 510). The primary site sends entity metadata pertaining to the entity to be replicated (message 511). The secondary site 103 receives the entity metadata and stores the metadata at the secondary site (operation 512). Further, the primary site sends a message comprising transactions that have been performed on the entity (message 513). The secondary site 103 receives the message comprising transactions and makes one or more entries in the transaction database at the secondary site (operation 514).

At some later moment in time, the protocol enters a loop. As shown, loop 550 is initiated when the originating site detects a change to a portion of an entity (message 515). At some still later moment in time, possibly after changes to the entity to be replicated have been detected, a message comprising snapshot data that corresponds to the changed entity or subcomponent thereof is sent to the secondary site (message 516). The secondary site carries out operations to populate the container with the snapshot data (operation 517). The originating site then composes a message that comprises metadata updates and/or updated transactions pertaining to the just sent snapshot data (message 520). The secondary site performs steps to update the metadata records (operation 522) and perform steps to update the transaction database (operation 524), after which loop 550 transfers processing back to where the originating site waits to detect another change to a portion of an entity.

Figure 6A:
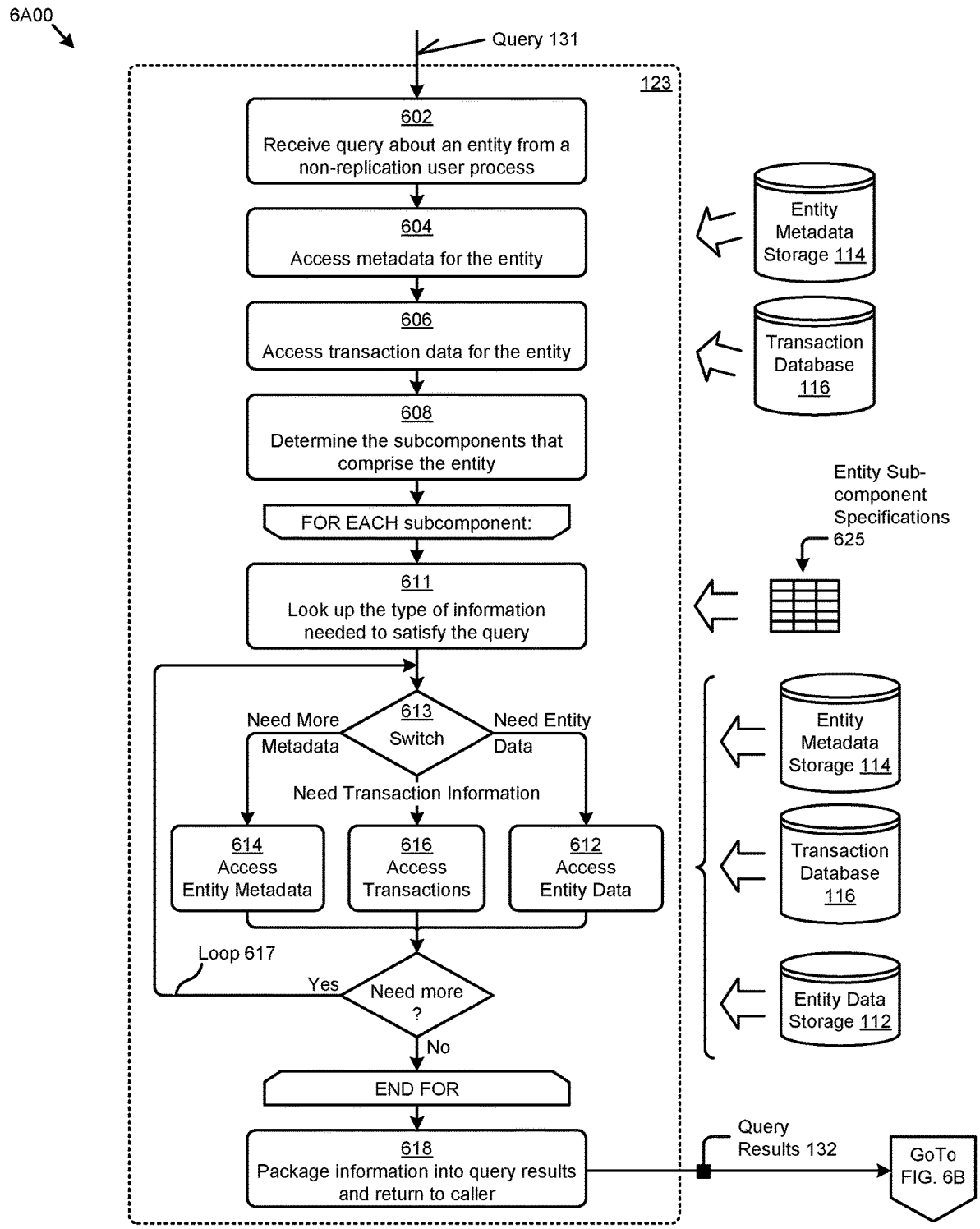
FIG. 6A is a flowchart that depicts a partial replica access technique as used in systems that that use snapshots to communicate operable portions of computing entities from an originating site to a secondary site for use on the secondary site before the computing entity is fully transferred, according to some embodiments.

FIG. 6A is a flowchart that depicts a partial replica access technique 6A00 as used in systems that that use snapshots to communicate operable portions of computing entities from an originating site to a secondary site for use on the secondary site before the computing entity is fully transferred. As an option, one or more variations of partial replica access technique 6A00 or any aspect thereof may be implemented in the context of the architecture and functionality of the embodiments described herein. The partial replica access technique 6A00 or any aspect thereof may be implemented in any environment.

The processing steps of partial replica access technique 6A00 can be carried out on any computing node anywhere in the environment. In this specific example, partial replica access technique 6A00 are carried out by the processing steps of a partial replica access module (e.g., the partial replica access module 120 of FIG. 1).

The embodiment shown in FIG. 6A depicts merely one example of processing a query from a user process and returning results. At any moment in time, process 123 is able to receive a query 131 (e.g., at step 602) with a request to provide information about an entity. The payload of the query identifies at least some information about one or more particular entities (e.g., a name and a namespace or a global unique identifier, etc.). As such, at step 604, entity metadata storage 114 is accessed. The entity metadata for a particular entity serves to identify any portions of the particular entity and/or to identify any/all constituent subcomponents of the particular entity. In some cases, a subcomponent of one particular entity is itself an entity that has its own associated entity metadata, and so on, recursively.

Using the identification of a particular entity being queried and/or using the retrieved metadata that corresponds to a particular entity being queried, transaction database 116 is accessed (step 606). Transaction data pertaining to the particular entity being queried is retrieved from the transaction database. Details (e.g., subcomponent status, timestamps, etc.) retrieved from the transaction database are used in subsequent processing. More specifically, at step 608, using the metadata for the entity and/or using the details retrieved from the transaction database, a set of entity subcomponent specifications 625 are determined, after which a FOR EACH loop is entered to iterate through each determined subcomponent.

In the FOR EACH loop, for each subcomponent, step 612 serves to look up the subcomponent type. As shown, the type of subcomponent might indicate that entity metadata is to be accessed, and/or the type of subcomponent might indicate that the transaction database is to be accessed, and/or the type of subcomponent might indicate that the entity data itself is to be accessed. Accordingly, step 611, switch 613 and loop 617 serve to perform a lookup based on the subcomponent type so as to return query results to the caller. The FOR EACH loop iterates over each subcomponent in one or more passes. With each pass, additional information (e.g., status information) is added to a data structure that forms a portion of query results 132 that are returned to the caller (step 618).

Returning to the discussion of the FOR EACH loop and operations of step 614 (e.g., to access entity metadata pertaining to the subcomponent), step 616 (e.g., to access transactions pertaining to the subcomponent), and step 612 (e.g., to access entity data pertaining to the subcomponent) are entered. The specific type of information (e.g., status information) to include in the query results might be based on a subcomponent type and/or any corresponding indication of status to be returned to the caller. Strictly as one example, Table 2 presents examples of subcomponent types and corresponding status information that can be codified into query results.

TABLE 2

Example subcomponent status information

| Subcomponent Type | Status Information |
| --- | --- |
| File or vDisk | Sets of ranges of logical blocks that have data |
| Virtual Machine | Configuration is: {complete∥not complete} |
| Virtual Disk | Specification is complete [T/F] |
| | Data is replicated [T/F] |
| Virtual NIC | Specification is complete [T/F] |
| | Indication of port status |
| Database | Set or ranges of tables |
| | Set or ranges of entries |
| Virtual Entity | Metadata is: {complete∥not complete} |
| Application | Dependent data structures are: |
| Data Structures | {complete∥not complete} |

The foregoing discussion of FIG. 6A includes query receipt and query response interactions with a non-replication user process so that the user process can access a partial replica so as to retrieve sufficient information for taking action on portions (e.g., subcomponents) of a partially replicated entity even before the entity has been fully replicated. A partial replica access technique and use of the query results by such a non-replication user process is disclosed in further detail as follows.

Figure 6B:
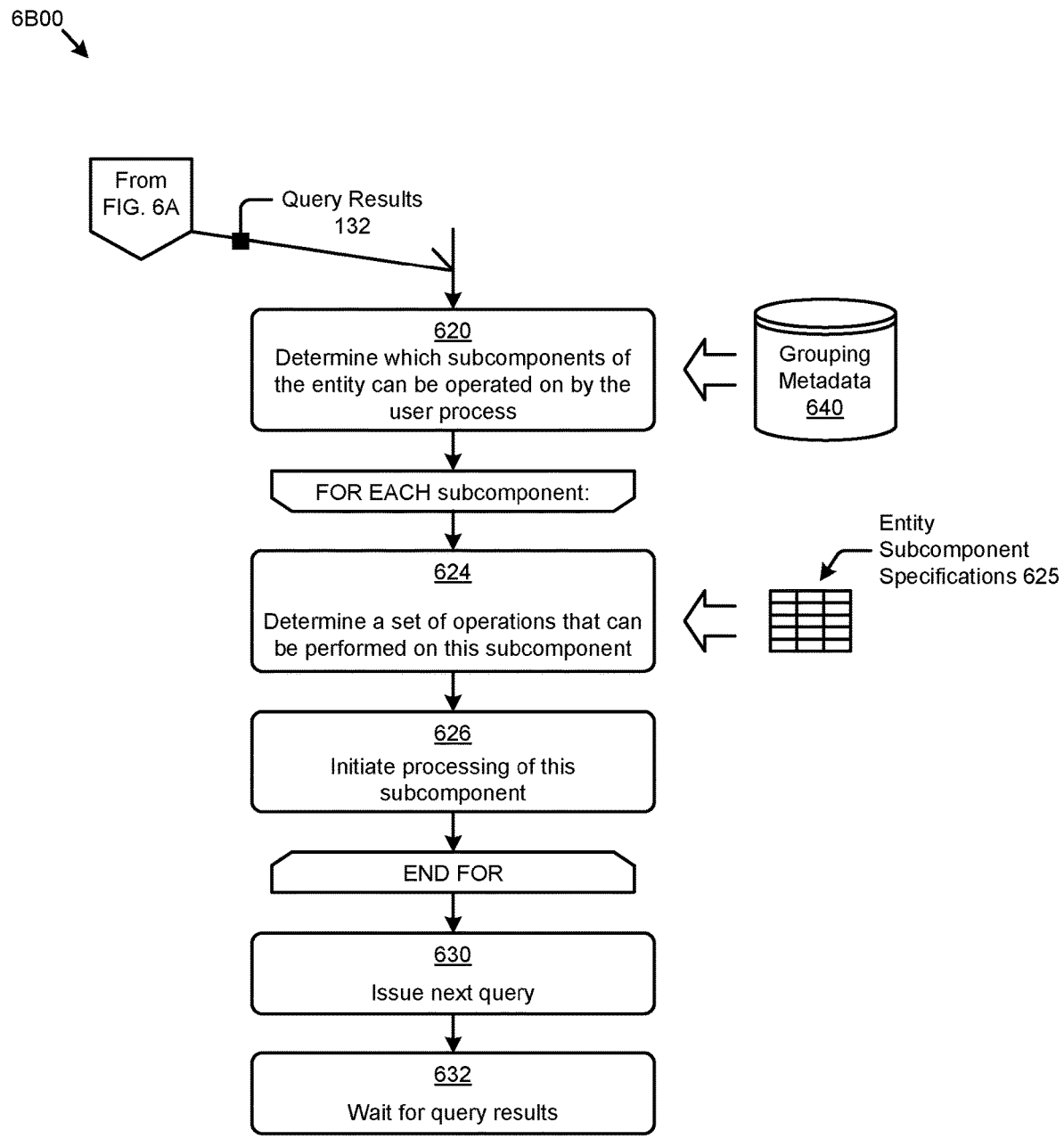
FIG. 6B is a flowchart that depicts a partial replica access technique as implemented by user processes in systems that that use snapshots to communicate operable portions of computing entities from an originating site to a secondary site for use on the secondary site before the computing entity is fully transferred, according to some embodiments.

FIG. 6B is a flowchart that depicts a partial replica access technique 6B00 as implemented by user processes in systems that that use snapshots to communicate operable portions of computing entities from an originating site to a secondary site for use on the secondary site before the computing entity is fully transferred. As an option, one or more variations of partial replica access technique 6B00 or any aspect thereof may be implemented in the context of the architecture and functionality of the embodiments described herein. The partial replica access technique 6B00 or any aspect thereof may be implemented in any environment.

The embodiment shown in FIG. 6B is merely one example of a user process that takes action on portions (e.g., subcomponents) of a partially replicated entity even before the entity has been fully replicated. As shown, the user process commences upon receipt of query results 132 that were provided as a result of interaction with a partial replica access module. As earlier mentioned, an entity might be composed of many subcomponents. Any of the subcomponents might be logically grouped into one or more groups that define which subcomponents can be considered together (e.g., as a collection) as well as what types of operations can be performed on constituents of a group.

Grouping metadata 640 serves to codify not only what types of operations can be performed on constituents of a group, but also defines constraints pertaining to the necessary status of a group before it can be operated on by a non-replication process. For example, some groups might define a consistency group, and such a group might further define that all constituents of the group must be "complete" before processing on any constituent of the group can commence.

As such, step 620 accesses grouping metadata 640 so as to determine which subcomponents of the entity can be operated on by the non-replication user process. The determined set of subcomponents is iterated over in a FOR EACH loop. Specifically, for each of the subcomponents of the entity or group that can be operated on, step 624 serves to determine a set of operations that can be performed on this subcomponent. A set of entity subcomponent specifications 625 are accessed and a check is made to determine if there is some sort of processing indicated for this subcomponent. If so, then step 626 serves to initiate such processing. This FOR EACH loop continues for each of the determined set of subcomponents, after which the user process is in a condition to issue a next query (step 630) and wait for corresponding query results to be returned (step 632).

Returning to the discussion of step 624, in some cases, when determining a set of operations that can be performed on a particular subcomponent, the transaction database is accessed to determine the then-current status of a particular subcomponent. The then-current status of a particular subcomponent might include a record number or other indication of the degree of replication of the parent entity. Such transactional information can be used to determine not only the type of operations that can be performed on a particular subcomponent, but also to determine extent information such as "the record number of the last record that has been replicated".

Table 3 presents a set of example user operations that correspond to a subcomponent type. A subcomponent grouping indication is also shown.

TABLE 3

Example user process operations

| Subcomponent Type | Example User Process Operations | Subcomponent Group |
|---|---|---|
| VM Specification | Create child virtual machines (e.g., in a map/reduce scenario) | G1 |
| File | Process the first portions of the file | G2 |
| First Database Table | Perform operation on that table | G3, G4 |
| Second Database Table | Perform operation that uses the first database table in conjunction with the second database table | G4 |
| List1 (e.g., list of mailboxes to process) | Process any available entries of the list | G5, G6 |
| List2 (e.g., list of messages in mailboxes of List1) | Process messages from List2 that have their parent mailbox in List1 | G6 |

By way of example, the table indicates that, given a subcomponent type "VM Specification" (e.g., a virtual machine specification), a permitted user process on that subcomponent is permitted to create child virtual machines. As another example, the row pertaining to a subcomponent of type "Second Database Table" includes an indication that an operation can be performed in conjunction with a "First Database Table". The row further indicates that both the "First Database Table" the "Second Database Table" belong to group G4. Such a group (e.g., G4) might inherit an indication of a consistency group, and that group must be "complete" before processing on any constituent of the group can commence. As such, any operation on any constituent of group G4 (e.g., the "First Database Table", the "Second Database Table") would not commence until both constituents are "complete".

Any of the foregoing embodiments can be implemented in one or more computing systems in one or more computing environments involving two or more nodes. In exemplary cases, entity replication is performed across two or more computing clusters such as in multiple cluster computing scenarios where two of the multiple computing clusters are situated in different locations (e.g., as in a disaster recovery scenario).

Figure 7:
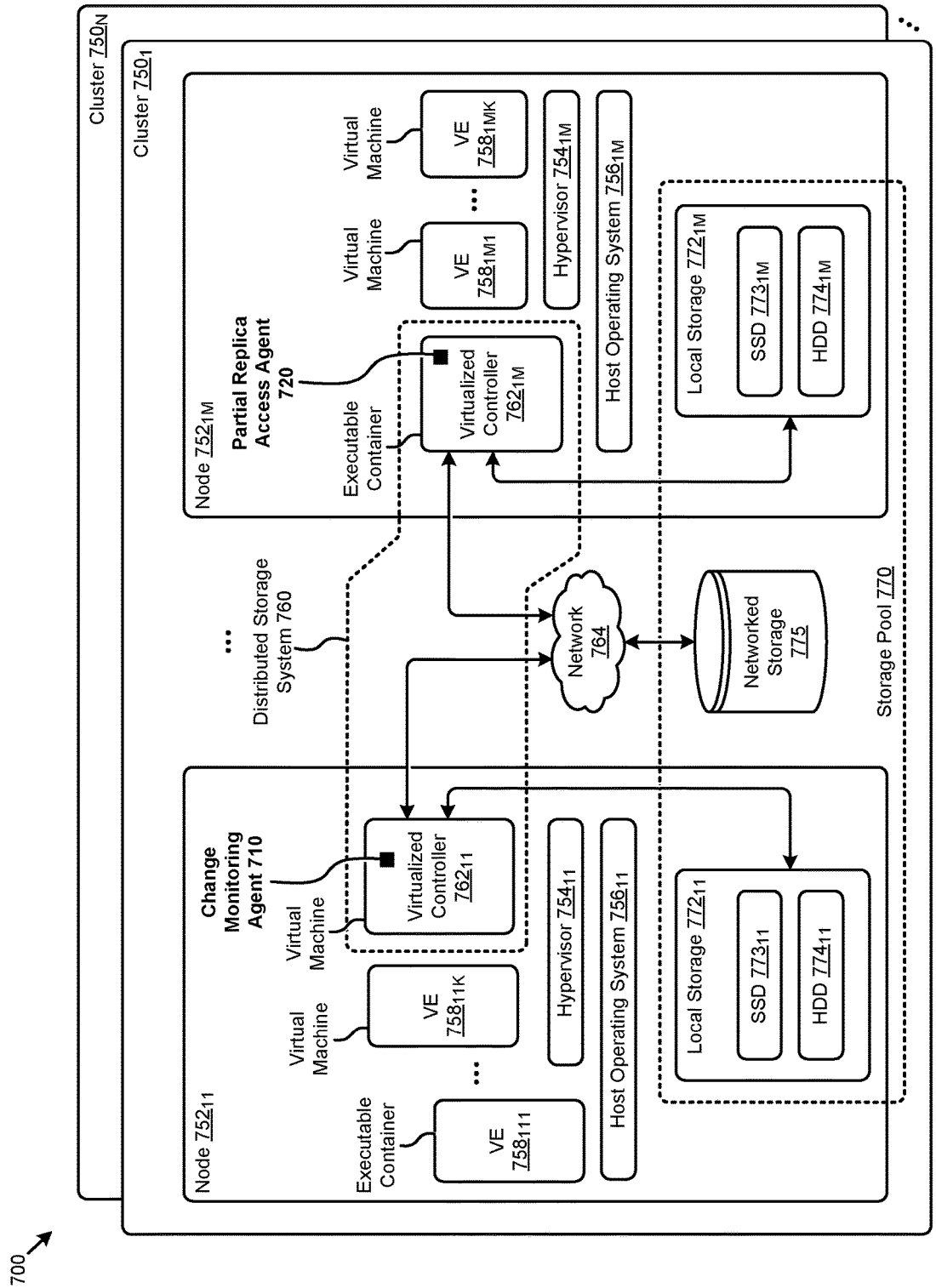
FIG. 7 depicts a multiple cluster computing environment in which embodiments as disclosed can operate, according to some embodiments.

FIG. 7 depicts a multiple cluster computing environment in which embodiments as disclosed can operate. As an option, one or more variations of multiple cluster computing environment or any aspect thereof may be implemented in the context of the architecture and functionality of the embodiments described herein.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization system 700 comprises multiple clusters (e.g., cluster $750_1$, ..., cluster $750_N$) comprising multiple nodes that have multiple tiers of storage in a storage pool. Representative nodes (e.g., node $752_{11}$, ..., node $752_{1M}$) and storage pool 770 associated with cluster $750_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, ..., local storage $772_{1M}$). For example, the local storage can be within or directly attached to a server and/or appliance associated with the nodes. Such local storage can include solid state drives (SSD $773_{11}$, ..., SSD $773_{1M}$), hard disk drives (HDD $774_{11}$, HDD $774_{1M}$), and/or other storage devices.

As shown, any of the nodes of the distributed virtualization system 700 can implement one or more user virtualized entities (e.g., VE $758_{111}$, VE $758_{11K}$, ..., VE $758_{1M1}$, ..., VE $758_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, ..., host operating system $756_{1M}$), while the VMs run multiple applications on various respective guest operating systems. Such flexibility can be facilitated at least in part by a hypervisor (e.g., hypervisor $754_{11}$, ..., hypervisor $754_{1M}$), which hypervisor is logically located between the various guest operating systems of the VMs and the host operating system of the physical infrastructure (e.g., node).

As an example, hypervisors can be implemented using virtualization software that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, ..., host operating system $756_{1M}$) without, in most cases, a hypervisor layer. This lightweight implementation can facilitate efficient distribution of certain software components, such as applications or services (e.g., micro-services). As shown, distributed virtualization system 700 can implement both a hypervisor-assisted virtualization environment and a container virtualization environment for various purposes.

Distributed virtualization system 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization system 700 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $752_{11}$ can interface with a controller virtual machine (e.g., virtualized controller $762_{11}$) through hypervisor $754_{11}$ to access storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to a first vendor's software, and a hypervisor at another node in the distributed storage system 760 might correspond to a second vendor's software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of an agent can be implemented in the distributed storage system 760 to facilitate the herein disclosed techniques. Specifically, change monitoring agent 710 can be implemented in the virtualized controller $762_{11}$, and partial replica access agent 720 can be implemented in the virtualized controller $762_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

ADDITIONAL EMBODIMENTS OF THE DISCLOSURE

Additional Practical Application Examples

Figure 8:
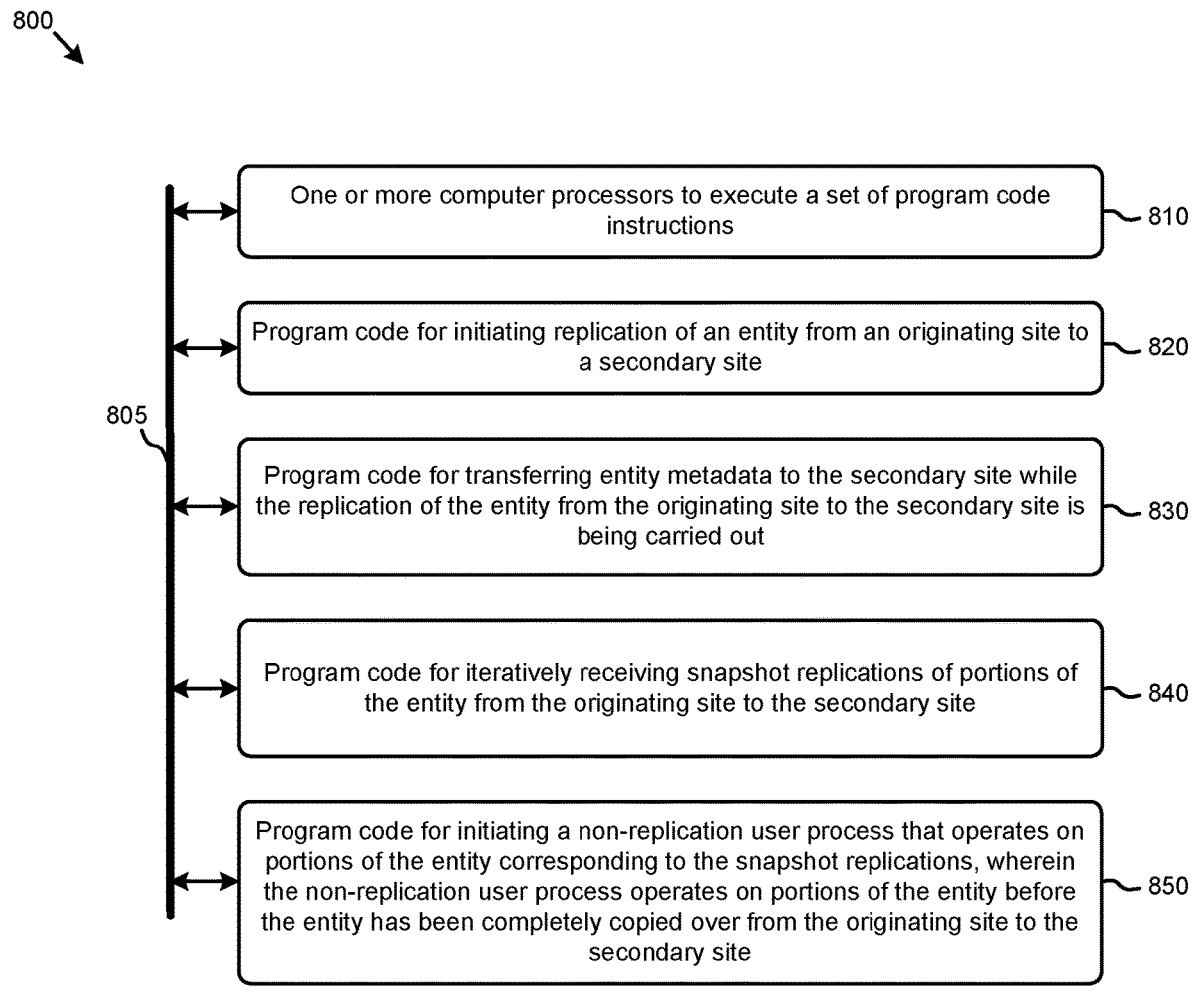
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address long wait times before a replicated computing entity can be used by a user process at a replication site. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: initiating replication of an entity from an originating site to a secondary site (module 820); transferring entity metadata to the secondary site while the replication of the entity from the originating site to the secondary site is being carried out (module 830); iteratively receiving snapshot replications of portions of the entity from the originating site to the secondary site (module 840); and initiating a non-replication user process that operates on portions of the entity corresponding to the snapshot replications, wherein the non-replication user process operates on portions of the entity before the entity has been completely copied over from the originating site to the secondary site (module 850).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

System Architecture Overview

Additional System Architecture Examples

Figure 9A:
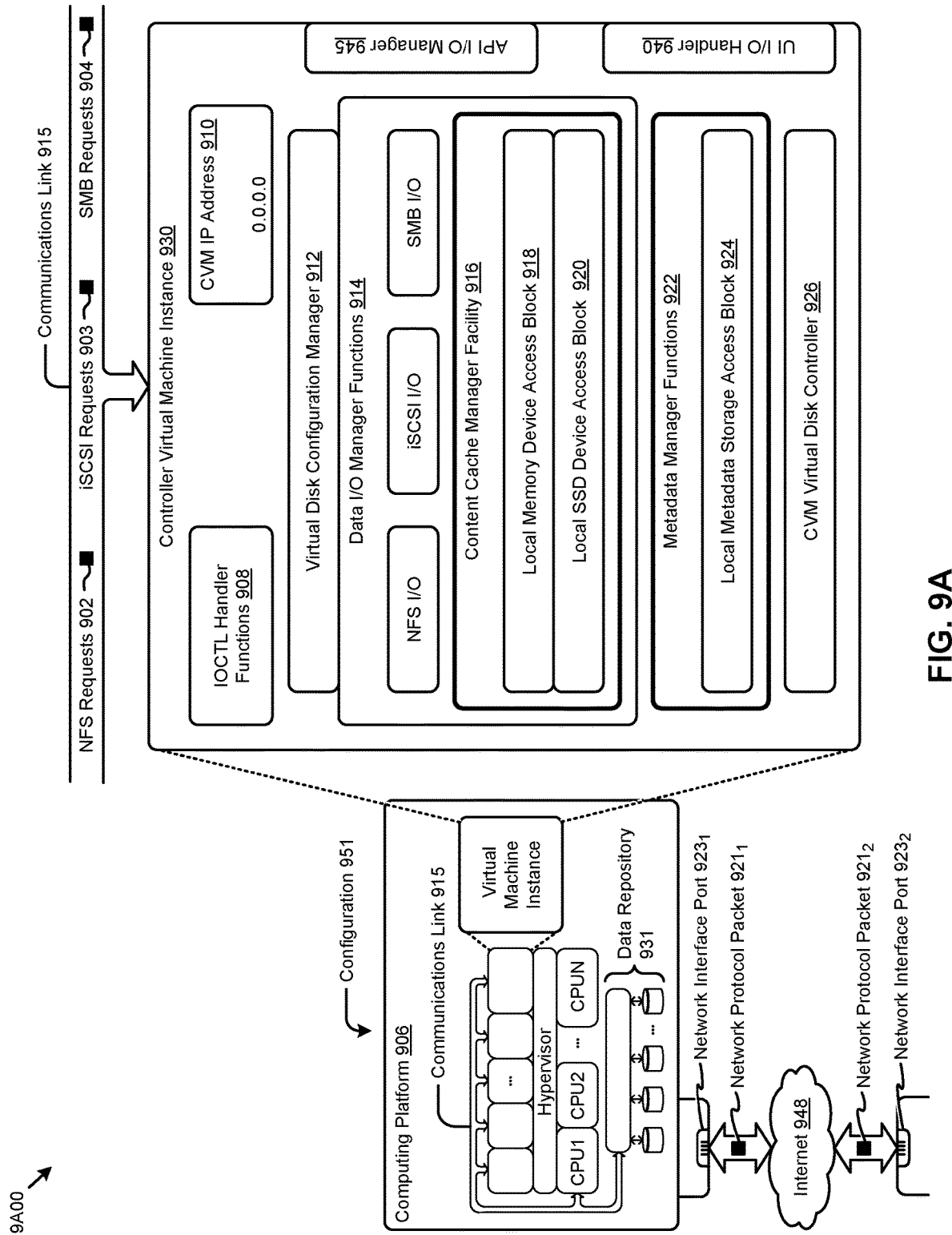
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to using snapshots to communicate operable portions of computing entities from an originating site to a secondary site for use on the secondary sites before the computing entity is fully transferred. In some embodiments, a module may include one or more state machines and/or combinational logic used to implement or facilitate the operational and/or performance characteristics pertaining to using snapshots to communicate operable portions of computing entities from an originating site to a secondary site for use on the secondary sites before the computing entity is fully transferred.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of using snapshots to communicate operable portions of computing entities from an originating site to a secondary site for use on the secondary site before the computing entity is fully transferred). Such files or records can be brought into and/or stored in volatile or non-volatile memory. More specifically, the occurrence and organization of the foregoing files, records, and data structures improve the way that the computer stores and retrieves data in memory, for example, to facilitate a secondary site's use of snapshots to begin performing operations over portions of computing entities received from an originating site before the computing entity is fully transferred to the secondary site, and/or for improving the way data is manipulated when managing access to partially replicated computing entities.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
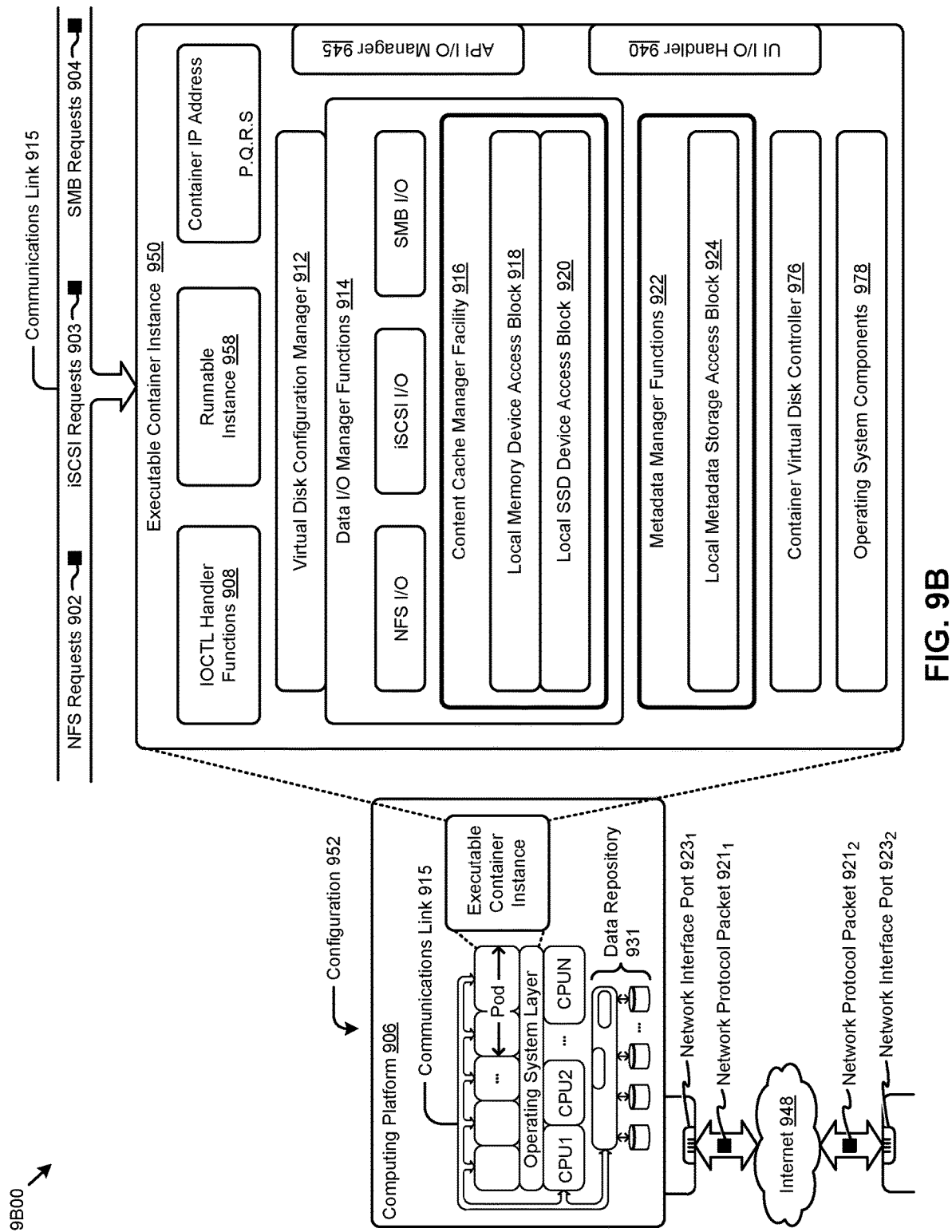

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
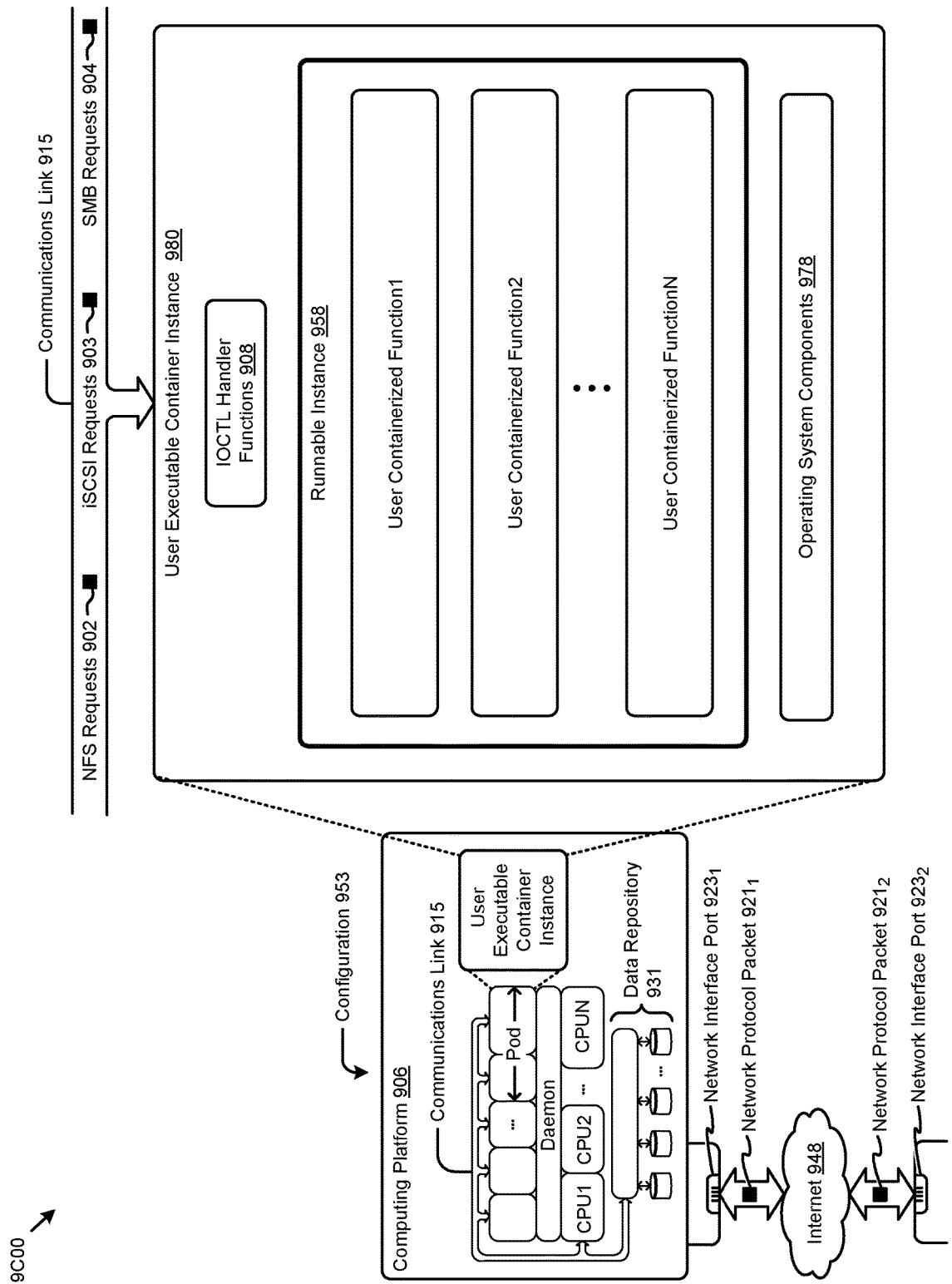

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown external data repository 931 and/or any forms of network accessible storage. As such, the multiple tiers of storage may include storage that is accessible over communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine (CVM) is referred to as a "CVM", or as a controller executable container, or as a service virtual machine (SVM), or as a service executable container, or as a storage controller. In some embodiments, multiple storage controllers are hosted by multiple nodes. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   iteratively receiving, at a secondary site, portions of an individual snapshot from an originating site while for replication of an entity from the originating site to the secondary site; and
   initiating, at the secondary site, a non-replication user process that operates on at least a subset of the portions of the individual snapshot iteratively received at the secondary site, wherein the non-replication user process operates on the subset of the portions of the individual snapshot before all of the portions of the individual snapshot of the entity have been iteratively received at the secondary site from the originating site.

2. The method of claim 1, wherein:
   the non-replication user process issues a query to identify the portions of the entity that have been replicated at the secondary site from the originating site and the query is processed by accessing entity metadata storage or a transaction database at the secondary site to determine a subcomponent of the entity.

3. The method of claim 2, wherein the query returns status information comprising at least one of, sets of ranges of logical blocks that have a complete data configuration, an indication that an entity subcomponent specification is complete, or an indication of port status.

4. The method of claim 3, further comprising:
   processing the status information to determine a set of subcomponents of the entity that can be operated over by the non-replication user process, and
   determining a set of one or more operations that can be performed on respective subcomponents using entity subcomponent specifications.

5. The method of claim 2, wherein the subcomponent is processed by executing a lookup based on a subcomponent type to identify information to satisfy the query.

6. The method of claim 5, wherein the information comprises entity metadata from the entity metadata storage, transaction information from the transaction database, or entity data from entity data storage.

7. The method of claim 1, wherein replication process establishes a secure communication channel between the originating site and the secondary site for iteratively receiving at the secondary site the portions of the individual snapshot from the originating site.

8. The method of claim 1, wherein the entity comprises one or more subcomponents, or an entity data preamble, or an entity data structure, or at least one of, a file, a virtual disk, a virtual machine, a virtual NIC, or a database.

9. A non-transitory computer readable medium having stored thereon a sequence of instructions which, when executed by a processor causes a set of acts comprising:
   iteratively receiving, at a secondary site, portions of an individual snapshot from an originating site for replication of an entity from the originating site to the secondary site; and
   initiating, at the secondary site, a non-replication user process that operates on at least a subset of the portions of the individual snapshot iteratively received at the secondary site, wherein the non-replication user process operates on the subset of the portions of the individual snapshot before all of the portions of the individual snapshot of the entity have been iteratively received at the secondary site from the originating site.

10. The computer readable medium of claim 9, wherein:
    the non-replication user process issues a query to identify the portions of the entity that have been replicated at the secondary site from the originating site and the query is processed by accessing entity metadata storage or a transaction database at the secondary site to determine a subcomponent of the entity.

11. The computer readable medium of claim 10, wherein the query returns status information comprising at least one of, sets of ranges of logical blocks that have a complete data configuration, an indication that an entity subcomponent specification is complete, or an indication of port status.

12. The computer readable medium of claim 11, wherein the set of acts further comprise:
    processing the status information to determine a set of subcomponents of the entity that can be operated over by the non-replication user process, and determining a set of one or more operations that can be performed on respective subcomponents using entity subcomponent specifications.

13. The computer readable medium of claim 10, wherein the subcomponent is processed by executing a lookup based on a subcomponent type to identify information to satisfy the query.

14. The computer readable medium of claim 13, wherein the information comprises entity metadata from the entity metadata storage, transaction information from the transaction database, or entity data from entity data storage.

15. The computer readable medium of claim 10, wherein replication process establishes a secure communication channel between the originating site and the secondary site for iteratively receiving at the secondary site the portions of the individual snapshot from the originating site.

16. The computer readable medium of claim 9, wherein the entity comprises one or more subcomponents, or an entity data preamble, or an entity data structure, or at least one of, a file, a virtual disk, a virtual machine, a virtual NIC, or a database.

17. A system comprising:
a storage medium having stored thereon a sequence of instructions; and
a processor that execute the sequence of instructions to cause a set of acts, the set of acts comprising,
iteratively receiving, at a secondary site, portions of an individual snapshot from an originating site for replication of an entity from the originating site to the secondary site; and
initiating, at the secondary site, a non-replication user process that operates on at least a subset of the portions of the individual snapshot iteratively received at the secondary site, wherein the non-replication user process operates on the subset of the portions of the individual snapshot before all of the portions of the individual snapshot of the entity have been iteratively received at the secondary site from the originating site.

18. The system of claim 17, wherein:
the non-replication user process issues a query to identify the portions of the entity that have been replicated at the secondary site from the originating site and the query is processed by accessing entity metadata storage or a transaction database at the secondary site to determine a subcomponent of the entity.

19. The system of claim 18, wherein the query returns status information comprising at least one of, sets of ranges of logical blocks that have a complete data configuration, an indication that an entity subcomponent specification is complete, or an indication of port status.

20. The system of claim 19, wherein the set of acts further comprise:
processing the status information to determine a set of subcomponents of the entity that can be operated over by the non-replication user process, and
determining a set of one or more operations that can be performed on respective subcomponents using entity subcomponent specifications.

21. The system of claim 18, wherein the subcomponent is processed by executing a lookup based on a subcomponent type to identify information to satisfy the query.

22. The system of claim 21, wherein the information comprises entity metadata from the entity metadata storage, transaction information from the transaction database, or entity data from entity data storage.

23. The system of claim 17, wherein replication process establishes a secure communication channel between the originating site and the secondary site for iteratively receiving at the secondary site the portions of the individual snapshot from the originating site.

24. The system of claim 17, wherein the entity comprises one or more subcomponents, or an entity data preamble, or an entity data structure, or at least one of, a file, a virtual disk, a virtual machine, a virtual NIC, or a database.

* * * * *